US008464901B2

(12) United States Patent
Karwacki, Jr. et al.

(10) Patent No.: US 8,464,901 B2
(45) Date of Patent: Jun. 18, 2013

(54) METHODS AND APPARATUS FOR DISPENSING SOLID ARTICLES

(75) Inventors: Edward Joseph Karwacki, Jr., Garner, NC (US); Bryan Patrick Farnsworth, Wake Forest, NC (US); Dennis Vaders, Elkin, NC (US); John Richard Sink, Raleigh, NC (US); Jody DuMond, Fairfax, VA (US); Daniel Gardiner, Wake Forest, NC (US)

(73) Assignee: PARATA Systems, LLC, Durham, NC (US)

( * ) Notice: Subject to any disclaimer, the term of this patent is extended or adjusted under 35 U.S.C. 154(b) by 1127 days.

(21) Appl. No.: 12/349,287

(22) Filed: Jan. 6, 2009

(65) Prior Publication Data

US 2009/0272758 A1 Nov. 5, 2009

Related U.S. Application Data

(60) Provisional application No. 61/050,451, filed on May 5, 2008.

(51) Int. Cl.
*B65H 3/08* (2006.01)
*B23Q 7/00* (2006.01)

(52) U.S. Cl.
USPC .......... 221/278; 221/174

(58) Field of Classification Search
USPC .......... 222/630, 636, 1; 221/174, 278, 1, 221/9
See application file for complete search history.

(56) References Cited

U.S. PATENT DOCUMENTS

| | | | | |
|---|---|---|---|---|
| 2,816,719 | A * | 12/1957 | Richert | 406/83 |
| 3,730,388 | A * | 5/1973 | Bender | 221/68 |
| 4,573,606 | A | 3/1986 | Lewis et al. | |
| 4,674,651 | A | 6/1987 | Scidmore et al. | |
| 4,767,023 | A * | 8/1988 | Hackmann et al. | 221/152 |
| 4,801,044 | A | 1/1989 | Kubota et al. | |
| 4,869,394 | A | 9/1989 | Hurst | |
| 4,913,315 | A * | 4/1990 | Wagner | 221/200 |
| 5,381,838 | A | 1/1995 | Watanabe et al. | |
| 6,116,821 | A * | 9/2000 | Teoh et al. | 406/137 |
| 6,220,313 | B1 | 4/2001 | Estlander | |
| 6,443,326 | B1 * | 9/2002 | Saito et al. | 221/163 |

(Continued)

FOREIGN PATENT DOCUMENTS

GB 1141886 2/1969

OTHER PUBLICATIONS

Office Action for corresponding Canadian Patent Application No. 2,662,694 mailed Feb. 24, 2012 (3 pages).

*Primary Examiner* — Kevin P Shaver
*Assistant Examiner* — Stephanie E Williams
(74) *Attorney, Agent, or Firm* — Myers Bigel Sibley & Sajovec, PA

(57) ABSTRACT

An apparatus for dispensing solid articles includes a housing and a gate system. The housing defines a dispensing channel and a portal through which articles can flow along a dispensing pathway. The gate system includes a gate member positioned in the dispensing pathway. The gate member is selectively positionable between an open position and a closed position. When the gate member is in the open position, the gate member permits the articles to pass through the portal and, when the gate member is in the closed position, the gate member blocks the articles from passing through the portal. The gate system is configured such that the gate member is passively transitionable between the open and closed positions.

29 Claims, 22 Drawing Sheets

U.S. PATENT DOCUMENTS

| | | | | |
|---|---|---|---|---|
| 6,631,826 | B2 | 10/2003 | Pollard et al. | |
| 6,971,541 | B2 | 12/2005 | Williams et al. | |
| 7,344,049 | B2 | 3/2008 | Daniels et al. | |
| 2006/0241807 | A1 * | 10/2006 | Daniels et al. | 700/235 |
| 2008/0029535 | A1 | 2/2008 | Kim | |
| 2008/0288105 | A1 | 11/2008 | Mauger et al. | |
| 2009/0039097 | A1 | 2/2009 | Farnsworth et al. | |
| 2009/0140002 | A1 | 6/2009 | Farnsworth et al. | |

* cited by examiner

METHODS AND APPARATUS FOR DISPENSING SOLID ARTICLES

RELATED APPLICATION(S)

This application claims the benefit of U.S. Provisional Patent Application No. 61/050,451, filed May 5, 2008, the disclosure of which is incorporated herein by reference.

FIELD OF THE INVENTION

The present invention is directed generally to the dispensing of solid articles and, more specifically, is directed to the automated dispensing of solid articles, such as solid pharmaceutical articles.

BACKGROUND OF THE INVENTION

Pharmacy generally began with the compounding of medicines which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. For example, U.S. Pat. No. 6,971,541 to Williams et al. describes an automated system for dispensing pharmaceuticals using dispensing bins. Each dispensing bin includes a hopper in which tablets are stored and a dispensing channel fluidly connecting the hopper to a dispensing outlet. Forward and reverse air flows are used to selectively convey the tablets through the dispensing channel in each of a dispensing direction (toward the outlet) and a reverse direction (toward the hopper). A counting sensor is positioned proximate the outlet of the dispensing channel and used to detect tablets passing the sensor in order to maintain a count of the tablets dispensed.

SUMMARY OF THE INVENTION

According to embodiments of the present invention, an apparatus for dispensing solid articles includes a housing and a gate system. The housing defines a dispensing channel and a portal through which articles can flow along a dispensing pathway. The gate system includes a gate member positioned in the dispensing pathway. The gate member is selectively positionable between an open position and a closed position. When the gate member is in the open position, the gate member permits the articles to pass through the portal and, when the gate member is in the closed position, the gate member blocks the articles from passing through the portal. The gate system is configured such that the gate member is passively transitionable between the open and closed positions.

According to method embodiments of the present invention, a method for dispensing solid articles includes providing an apparatus including: a housing defining a dispensing channel and a portal through which articles can flow along a dispensing pathway; and a gate system including a gate member positioned in the dispensing pathway, the gate member being selectively positional between an open position and a closed position; wherein, when the gate member is in the open position, the gate member permits the articles to pass through the portal and, when the gate member is in the closed position, the gate member blocks the articles from passing through the portal; and wherein the gate system is configured such that the gate member is passively transitionable between the open and closed positions. The method further includes: transitioning the gate member from the closed position to the open position and, with the gate member in the open position, passing the articles along the dispensing pathway, through the portal, and past the gate member; and transitioning the gate member from the open position to the closed position such that the gate member blocks the articles from passing through the portal.

According to embodiments of the present invention, an apparatus for dispensing solid articles includes a housing, a drive mechanism and a gate system. The housing defines a dispensing channel and a portal through which articles can flow along a dispensing pathway. The drive mechanism includes a flow generator configured to generate at least one drive gas flow to pass the articles along the dispensing pathway. The gate system includes a gate member positioned in the dispensing pathway, and a gate actuator. The gate member is selectively positionable between an open position and a closed position. When the gate member is in the open position, the gate member permits the articles to pass through the portal and, when the gate member is in the closed position, the gate member blocks the articles from passing through the portal. The gate actuator is operable to selectively transition the gate member between the open and closed positions.

According to method embodiments of the present invention, a method for dispensing solid articles includes providing an apparatus including: a housing defining a dispensing channel and a portal through which articles can flow along a dispensing pathway; a drive mechanism including a flow generator configured to generate at least one drive gas flow to pass the articles along the dispensing pathway; and a gate system including a gate member and a gate actuator. The gate member is positioned in the dispensing pathway, the gate member being selectively positionable between an open position and a closed position, wherein, when the gate member is in the open position, the gate member permits the articles to pass through the portal and, when the gate member is in the closed position, the gate member blocks the articles from passing through the portal. The gate actuator is operable to selectively transition the gate member between the open and closed positions. The method further includes generating at least one drive gas flow using the flow generator to force the articles along the dispensing pathway. The gate member is selectively transitioned between the open and closed positions using the gate actuator.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
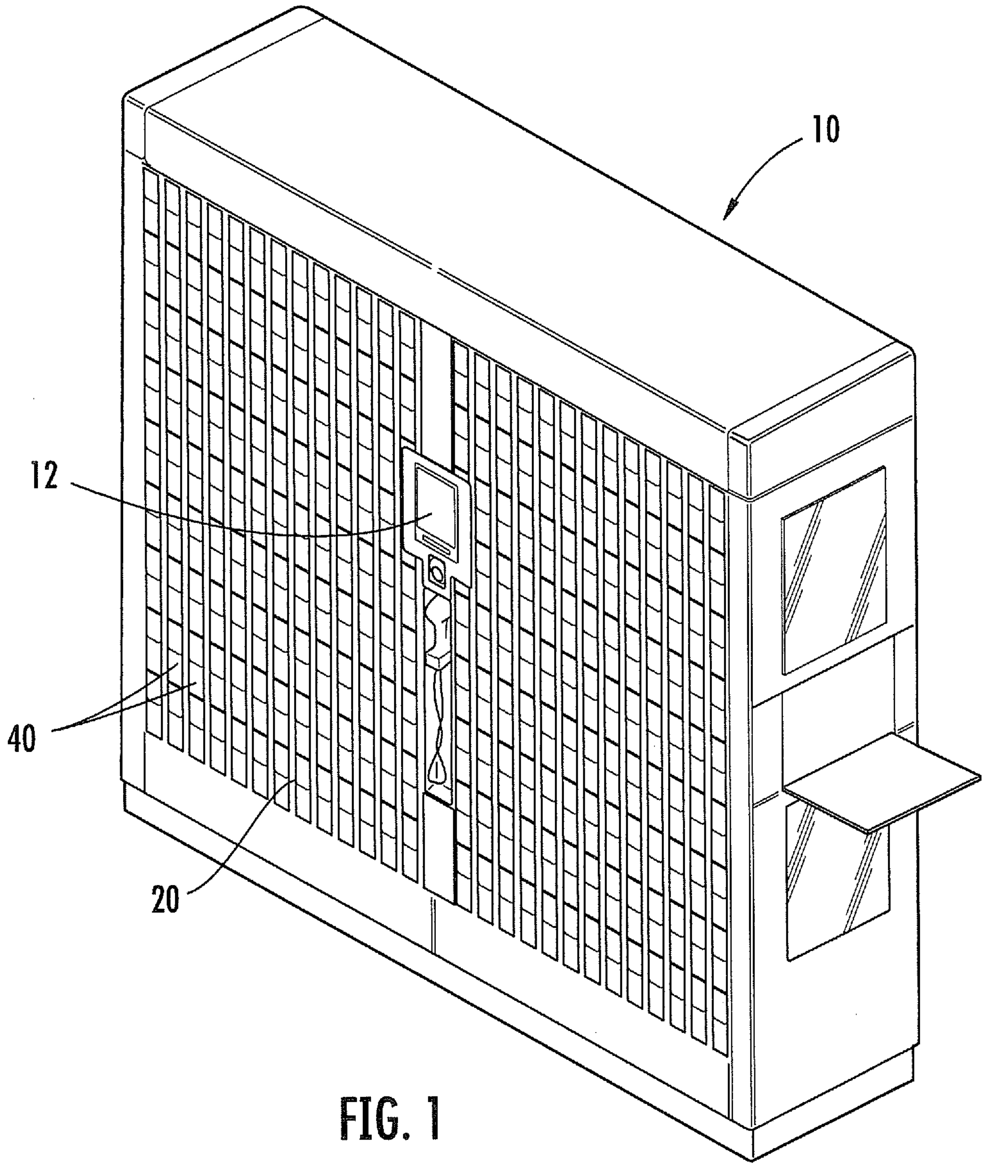
FIG. 1 is a front perspective view of an automated pharmacy machine according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In accordance with embodiments of the present invention, apparatus and methods are provided for dispensing solid articles. According to some embodiments, the solid articles are solid pharmaceutical articles. In particular, such methods and apparatus may be used to dispense pharmaceutical pills or tablets. Dispensing apparatus according to embodiments of the present invention include a housing defining a dispensing channel and a portal through which articles can flow along a dispensing pathway. A gate system or assembly is provided having a gate member that can be selectively positioned in an open position (to permit the passage of the articles through the portal) or, alternatively, in a closed position (to block the passage of the articles through the portal). In some embodiments, the gate member is passively transitionable between the open and closed positions. As used herein with regard to gate members, “passively transitionable”, “passively transitioned” or “passively moved” means that the gate member is transitionable, transitioned or moved without being driven, directly or via a linkage, by an active actuator such as a solenoid or motor. In some such embodiments, a drive gas flow is generated to pass the articles along the dispensing pathway and the drive gas flow also forces the gate member from the closed position to the open position. These and further aspects and embodiments of the present invention will be discussed in further detail hereinbelow.

Figure 2:
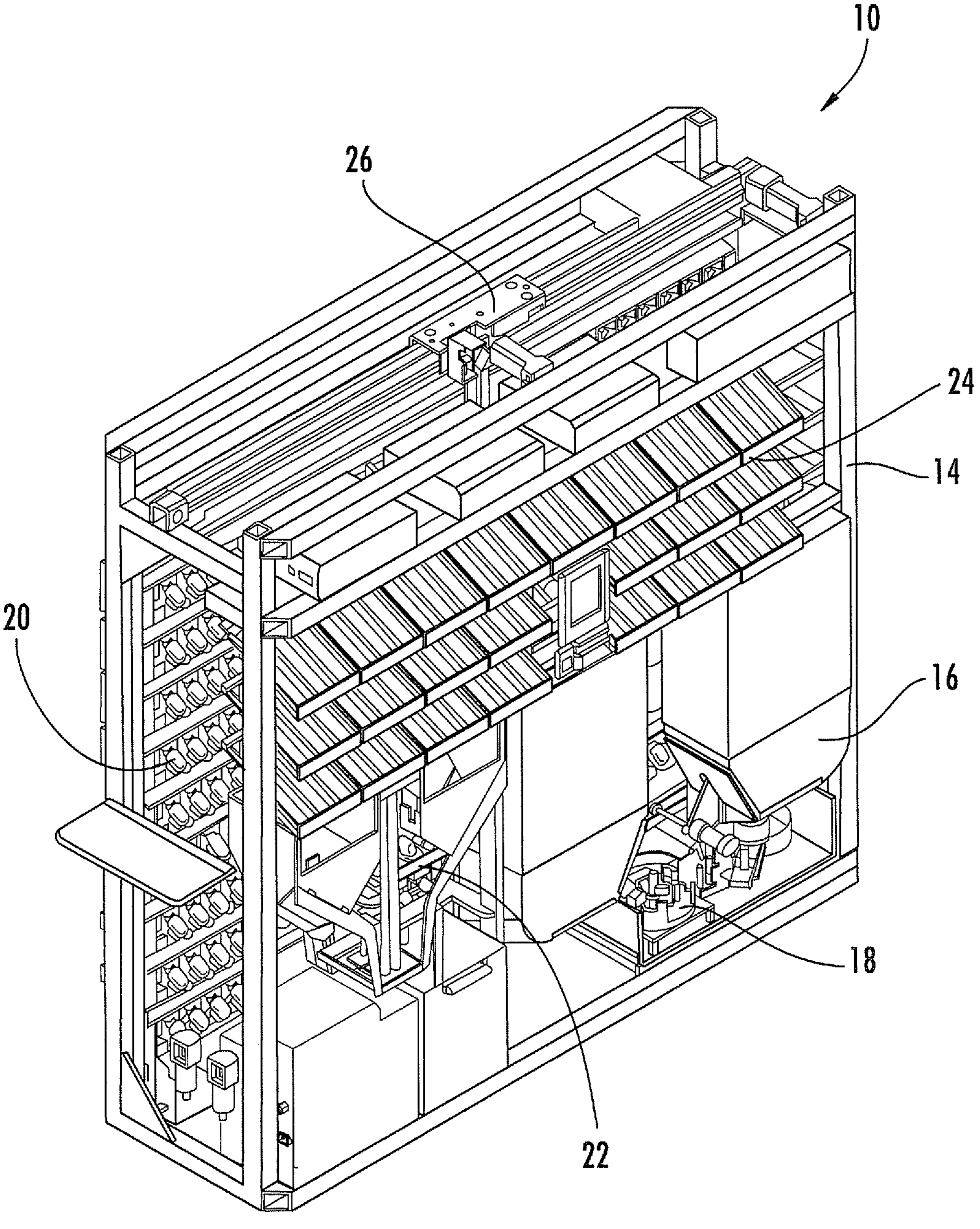
FIG. 2 is a rear perspective view of the automated pharmacy machine of FIG. 1 with the outer skin removed to permit visual access to components housed therein.
Figure 3:
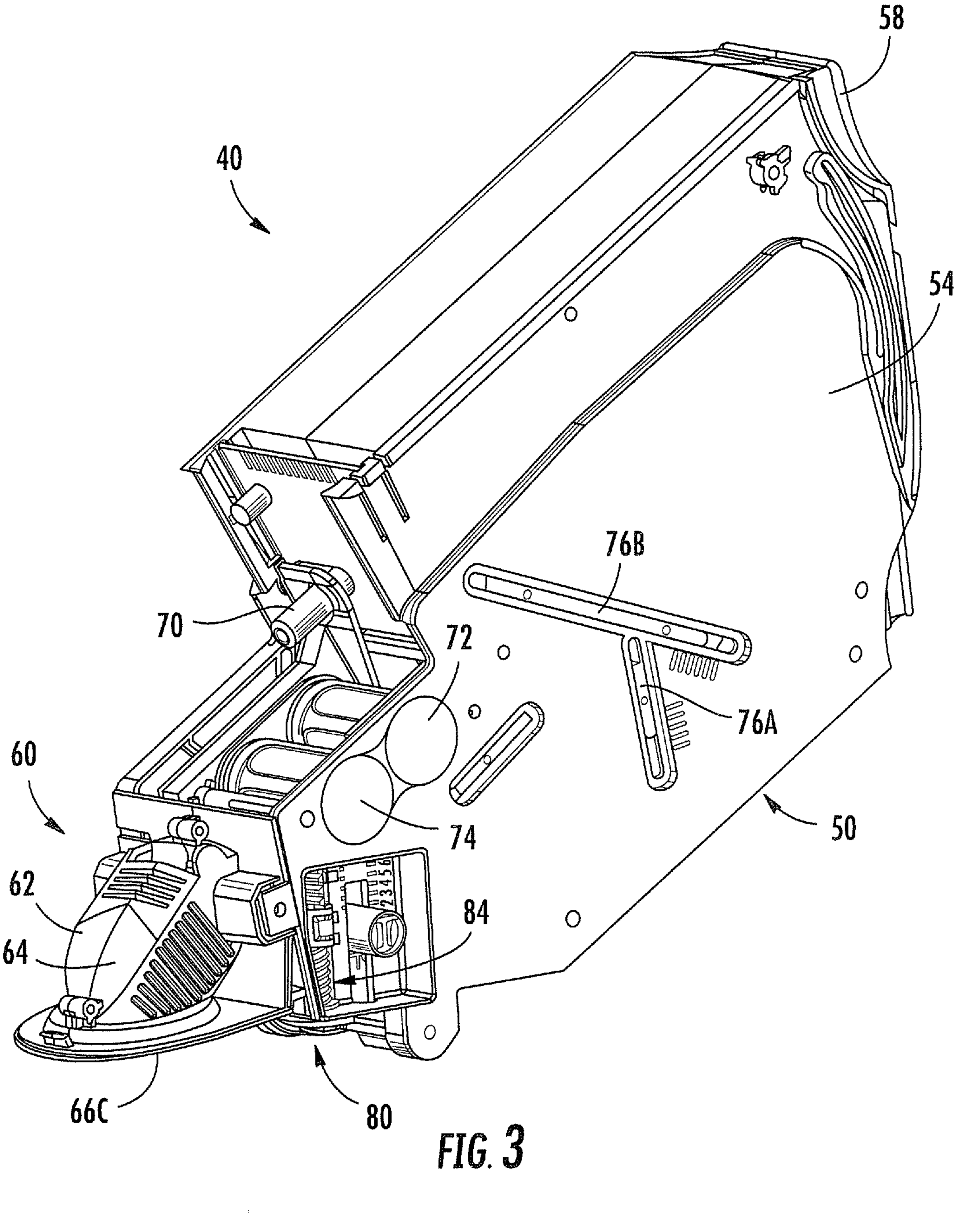
FIG. 3 is a front, right perspective view of a dispensing bin according to some embodiments of the present invention forming a part of the tablet dispensing system of FIG. 1.

A dispensing system according to embodiments of the present invention and that can carry out the foregoing methods is illustrated in FIGS. 1-5G and designated broadly therein at 10 (FIGS. 1 and 2). The dispensing system 10 includes a support frame 14 for the mounting of its various components. Those skilled in this art will recognize that the frame 14 illustrated herein is exemplary and can take many configurations that would be suitable for use with the present invention. The frame 14 provides a strong, rigid foundation to which other components can be attached at desired locations, and other frame forms able to serve this purpose may also be acceptable for use with this invention.

The system 10 generally includes as operative stations a controller (represented herein by a graphical user interface 12), a container dispensing station 16, a labeling station 18, a tablet dispensing station 20, a closure station 22, and an offloading station 24. In the illustrated embodiment, containers, tablets and closures are moved between these stations with a dispensing carrier 26; however, in some embodiments, multiple carriers are employed. The dispensing carrier 26 has the capability of moving the container to designated locations within the frame 14. Except as discussed herein with regard to the dispensing station 20, each of the operative stations and the conveying devices may be of any suitable construction such as those described in detail in U.S. Pat. No. 6,971,541 to Williams et al., U.S. Pat. No. 7,344,049, and U.S. patent application Ser. Nos. 11/599,526; 11/599,576; 11/679,850; and 11/111,270, the disclosures of which are hereby incorporated herein in their entireties.

The controller 12 controls the operation of the remainder of the system 10. In some embodiments, the controller 12 will be operatively connected with an external device, such as a personal or mainframe computer, that provides input information regarding prescriptions. In other embodiments, the controller 12 may be a stand-alone computer that directly receives manual input from a pharmacist or other operator. The controller 12 may be distributed with a portion thereof mounted on each bin as described hereinbelow. As used herein, the controller 12 may refer to a central controller and/or a dedicated controller onboard an associated bin. An exemplary controller is a conventional microprocessor-based personal computer.

In operation, the controller 12 signals the container dispensing station 16 that a container of a specified size is desired. In response, the container dispensing station 16 delivers a container to the labeling station 18. The labeling station 18 includes a printer that is controlled by the controller 12. The printer prints and presents an adhesive label that is affixed to the container. The carrier 26 moves the labeled container to the appropriate bin 40 for dispensing of tablets in the container.

Figure 5A:
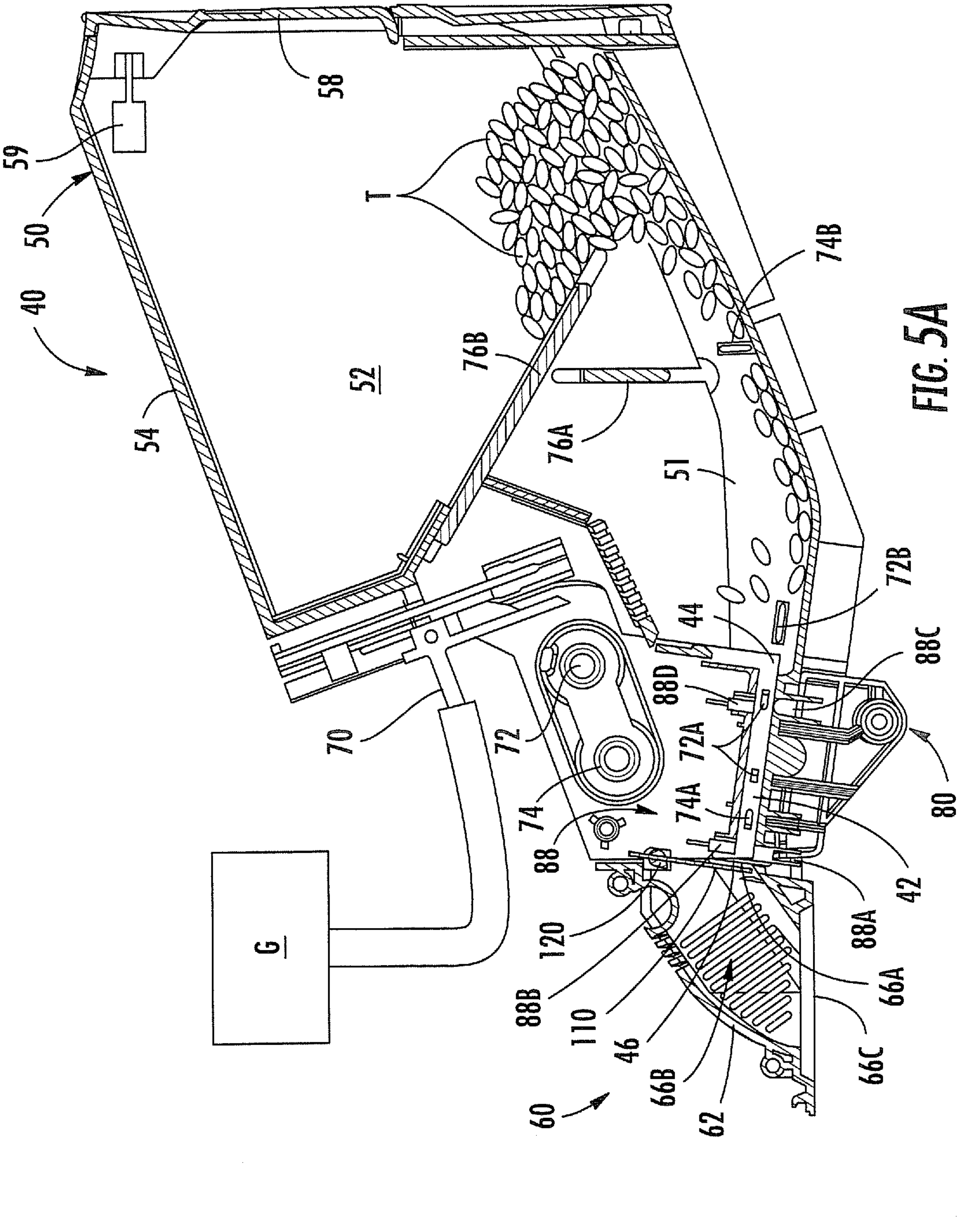
FIG. 5A is a cross-sectional view of the bin of FIG. 3.

Filling of labeled containers with tablets is carried out by the tablet dispensing station 20. The tablet dispensing station 20 comprises a plurality of tablet dispensing bin assemblies or bins 40 (described in more detail below), each of which holds a bulk supply of individual tablets (typically the bins 40 will hold different tablets). Referring to FIGS. 1, 2, and 5A, the dispensing bins 40, which may be substantially identical in size and configuration, are organized in an array mounted on the rails of the frame 14. Each dispensing bin 40 has a dispensing passage or channel 42 with an outlet or portal 46 that faces generally in the same direction to create an access region for the dispensing carrier 26. The identity of the tablets in each bin is known by the controller 12, which can direct the dispensing carrier 26 to transport the container to the proper bin 40. In some embodiments, the bins 40 may be labeled with a bar code, RFID tag or other indicia to allow the dispensing carrier 26 to confirm that it has arrived at the proper bin 40.

The dispensing bins 40 are configured to singulate, count, and dispense the tablets contained therein, with the operation of the bins 40 and the counting of the tablets being controlled by the controller 12. Some embodiments may employ the controller 12 as the device which monitors the locations and contents of the bins 40; others may employ the controller 12 to monitor the locations of the bins, with the bins 40 including indicia (such as a bar code or electronic transmitter) to identify the contents to the controller 12. In still other embodiments, the bins 40 may generate and provide location and content information to the controller 12, with the result that the bins 40 may be moved to different positions on the frame 14 without the need for manual modification of the controller 12 (i.e., the bins 40 will update the controller 12 automatically).

Any of a number of dispensing units that singulate and count discrete objects may be employed if suitably modified to include the inventive aspects disclosed herein. In particular, dispensing units that rely upon targeted air flow and a singulating nozzle assembly may be used, such as the devices described in U.S. Pat. No. 6,631,826 to Pollard et al., U.S. Pat. No. 7,344,049, U.S. patent application Ser. No. 11/750,710, and/or U.S. patent application Ser. No. 11/834,936, each of which is hereby incorporated herein by reference in its entirety. Bins of this variety may also include additional features, such as those described below.

After the container is desirably filled by the tablet dispensing station 20, the dispensing carrier 26 moves the filled container to the closure dispensing station 22. The closure dispensing station 22 may house a bulk supply of closures and dispense and secure them onto a filled container. The dispensing carrier 26 then moves to the closed container, grasps it, and moves it to the offloading station 24.

Turning to the bins 40 in more detail, an exemplary bin 40 is shown in more detail in FIGS. 3-5A. The bin 40 includes a housing 50 having a hopper portion 54 and a nozzle 60. The bin 40 is fluidly connected with a pressurized gas source G (FIG. 5A).

Referring to FIG. 5A, the hopper portion 54 defines a hopper chamber 52 that can be filled with tablets T. The bin 40 can be filled or replenished with tablets through an opening located at the upper rear portion of the bin 40. The opening is selectively accessible via a pivoting door 58, for example, that normally resides in a closed position as shown in FIG. 5A and which can be pivoted open to access the opening. According to some embodiments, a locking assembly 59 is provided to selectively secure the door 58 in its closed position. The locking assembly may be constructed and operable in the manner described in U.S. patent application Ser. No. 11/760,016, filed Jun. 8, 2007, the disclosure of which is incorporated herein by reference.

The tablets T can be dispensed one at a time into the container C (FIG. 5D) through the dispensing channel 42. The dispensing channel 42 has an inlet 44 adjacent and fluidly connecting the channel 42 to the hopper chamber 52. The dispensing channel 42 includes the portal 46 downstream from and opposite the inlet 44 and through which tablets may exit to be dispensed into the container C. The bin 40 defines a tablet dispensing path from the inlet 44, through the dispensing channel 42, through the portal 46, and through the nozzle 60. According to some embodiments and as illustrated, the dispensing channel 42 is uniformly rectangular in cross-section from the inlet 44 to the portal 46.

The hopper portion 54 has a bottom wall defining a floor 51. The floor 51 has a sloped rear portion that slopes downwardly toward the inlet 44. The floor 51 also has a funnel-shaped front portion. A front agitation port or outlet 72B and a rear agitation port or outlet 74B are provided in the floor 51. As discussed below, air or other pressurized gas can be flowed through the outlets 72B, 74B and into the hopper chamber 52 to agitate the tablets T contained therein.

One or more partition or divider walls 76A, 76B may extend through the hopper chamber 52 and form gaps or choke points and subchambers as described in U.S. patent application Ser. No. 11/750,710, filed May 18, 2007, the disclosure of which is incorporated herein by reference.

The housing 50 further includes a high-pressure supply port or nozzle 70. In use, the pressurized gas source G (FIG. 5A) is fluidly connected to the high-pressure nozzle 70 via a manifold, fitting, flexible or rigid conduit, or the like. The gas source G may include a compressor or a container of compressed gas, for example. The high-pressure gas source G is operative to provide a supply gas flow of a suitable working gas at a high pressure to the nozzle 70. According to some embodiments, the supplied gas is or includes air. According to some embodiments, the pressure of the supplied gas at the nozzle 70 is at least about 10 psi and, according to some embodiments, between about 10 and 60 psi.

A gas supply passage or conduit fluidly connects the high-pressure nozzle 70 to a forward control valve 72 (FIG. 5A). Two forward jet supply passages fluidly connect the forward control valve 72 to respective forward drive jet apertures or outlets 72A. The forward drive jet outlets 72A are positioned and configured to direct air or other supplied gas into the dispensing channel 42. A front agitation supply passage fluidly connects the forward control valve 72 to the front agitation outlet 72B to direct air or other supplied gas into the hopper chamber 52. The forward control valve 72 is operable to control airflow to the forward drive jet outlets 72A and the front agitation outlet 72B.

A further gas supply passage or conduit fluidly connects the high pressure nozzle 70 to a reverse control valve 74 (FIG. 5A). A reverse jet supply passage fluidly connects the reverse control valve 74 to a reverse drive jet aperture or outlet 74A. The reverse drive jet outlet 74A is positioned and configured to direct air or other supplied gas into the dispensing channel 42. A rear agitation supply passage fluidly connects the reverse control valve 74 to the rear agitation outlet 74B to direct air or other supplied gas into the hopper chamber 52. The reverse control valve 74 is operable to control airflow to the reverse drive jet outlet 74A and the rear agitation outlet 74B.

The front and rear agitation outlets 72B, 74B may be provided with air amplifiers as described in U.S. patent application Ser. No. 11/750,710, filed May 18, 2007, the disclosure of which is incorporated herein by reference. The air amplifiers convert a supplied pressurized gas flow having a given pressure, velocity and mass flow rate into an exiting or output air flow having a comparatively lower pressure, and higher mass flow rate.

Alternative mechanisms may be used to provide the agitation gas flows discussed herein. For example, the system 10 may provide agitation flow using a separate low pressure manifold as disclosed in U.S. Pat. No. 7,344,049.

With reference to FIGS. 3-5A, the bin 40 further includes an adjustable dispensing channel subassembly 80. The subassembly 80 includes a fixed side wall 56, a ceiling member 81, a floor member 82, a follower side wall 83, a dispensing channel height adjustment mechanism 84, and a dispensing channel width adjustment mechanism 85.

The fixed side wall 56 is fixed with respect to and may be secured to or integrally formed with the housing 50. The drive jet outlets 72A, 74A are formed in the fixed side wall 56.

The floor member 82 includes a floor wall 82A. The floor member 82 is movable (e.g., slidable) left and right along an axis W-W relative to the fixed side wall 56. The floor wall 82A can be selectively moved relative to the fixed side wall 56 and set using the adjustment mechanism 85. The follower side wall 83 slides left and right with the floor wall 82A so that the lateral spacing between the follower side wall 83 and the fixed side wall 56 can be changed and set using the adjustment mechanism 85.

The ceiling member 81 includes a ceiling wall 81A and a side wall 81B. The ceiling member 81 is movable (e.g., slidable) up and down along an axis H-H relative to the fixed side wall 56 and the floor wall 82A. The heightwise spacing between the ceiling wall 81A and the floor wall 82A can be selectively changed and set using the adjustment mechanism 84. The follower side wall 83 slides up and down relative to the floor member 82 to accommodate repositioning of the ceiling member 81.

As illustrated, the adjustment mechanisms 84, 85 each comprise a thumbscrew adjuster 84A, 85A rotatably fixed in the housing 50 and operatively engaging threaded bores of the ceiling member 81 and the floor member 82, respectively. However, other types of adjustment mechanisms may be used.

Figure 4:
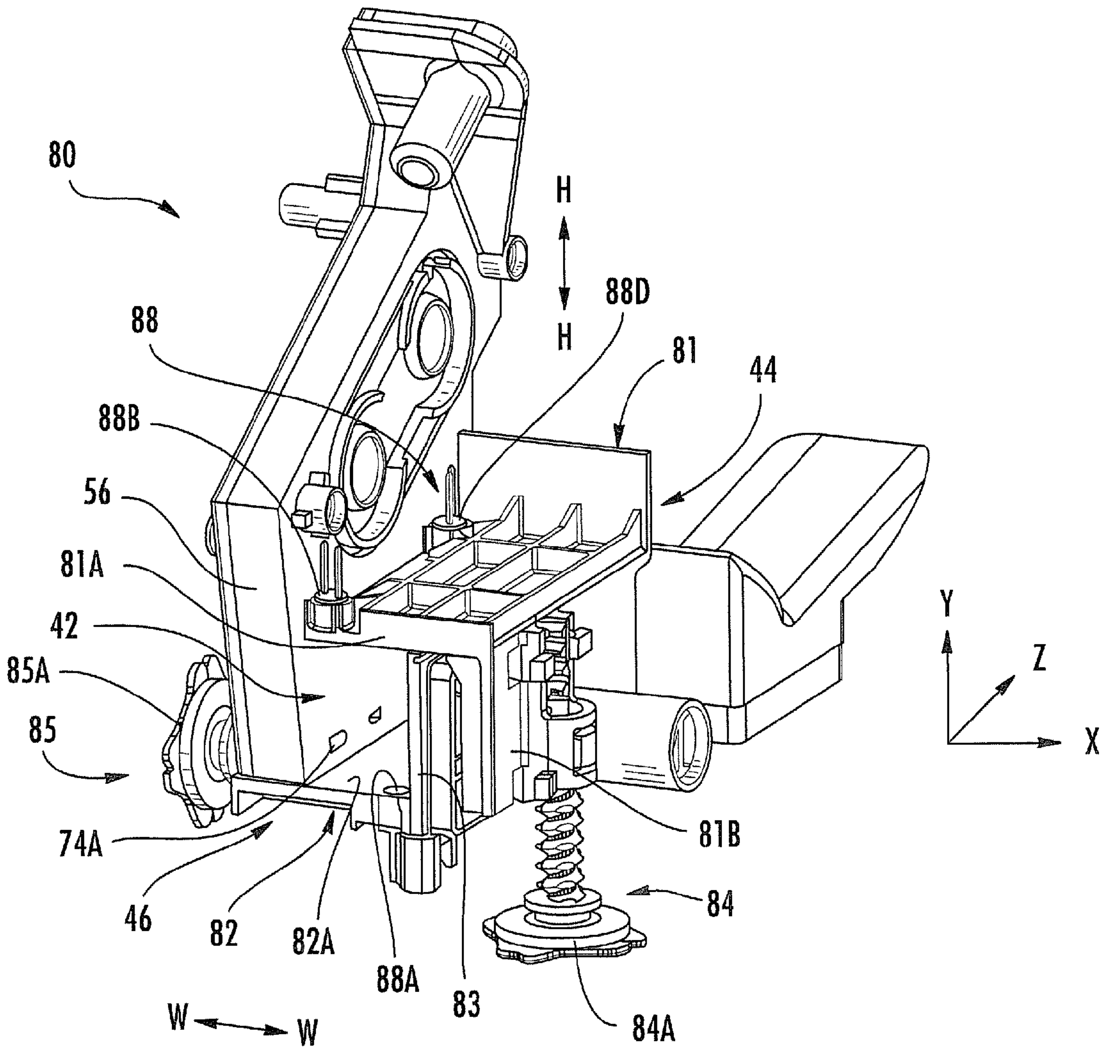
FIG. 4 is a front, right perspective view of an adjustable dispensing channel subassembly forming a part of the dispensing bin of FIG. 3.
Figure 5B:
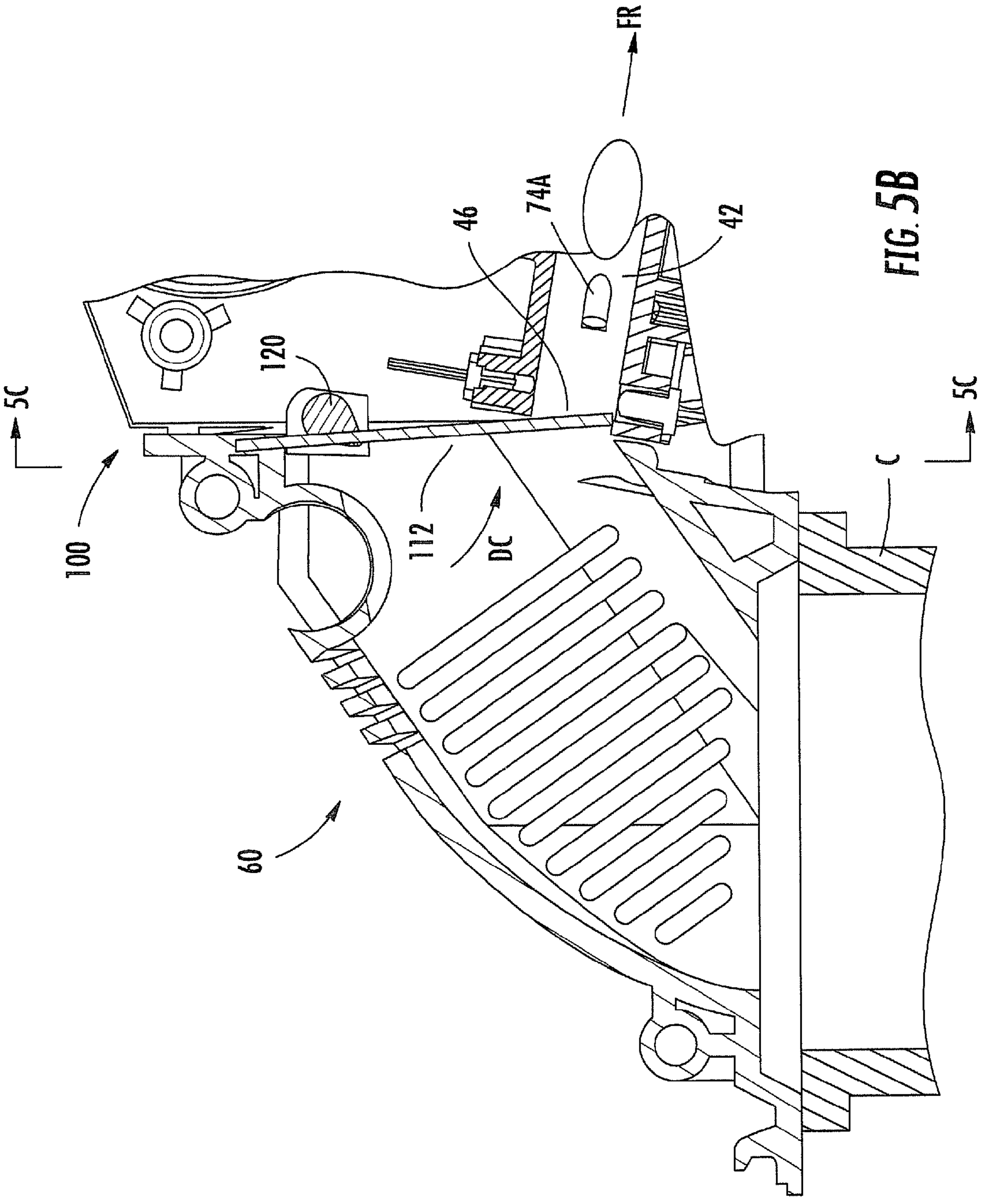
FIG. 5B is an enlarged, fragmentary cross-sectional view of the bin of FIG. 3 wherein a gate member thereof is in a closed position.
Figure 5C:
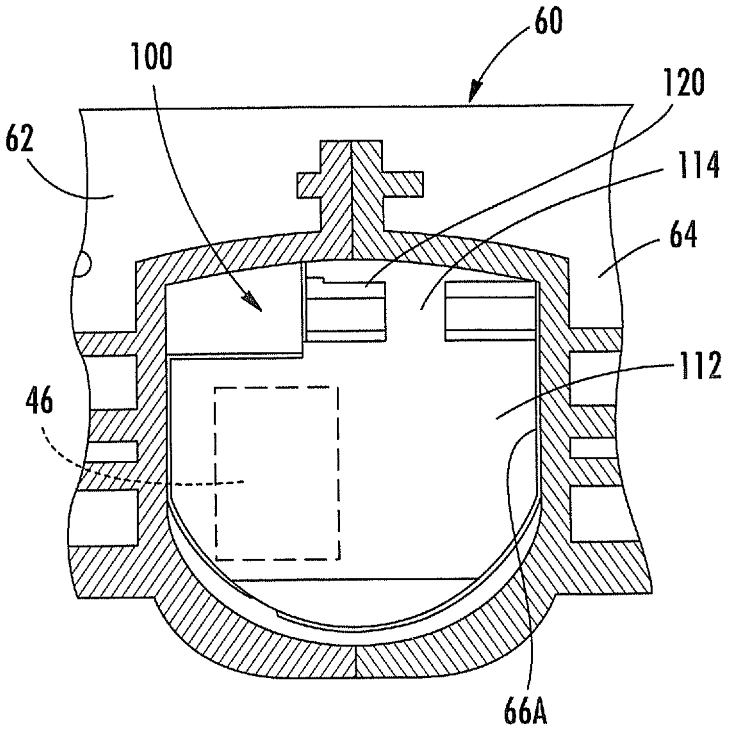
FIG. 5C is an enlarged, fragmentary cross-sectional view of the bin of FIG. 3 taken along the line 5C-5C of FIG. 5B.

The fixed side wall 56, the ceiling wall 81A, the floor wall 82A, and the follower side wall 83 together define the dispensing channel 42, the inlet 44, and the portal 46. More particularly, the forward ends or edges of the components 56, 81, 82, 83 collectively form the portal 46 (FIGS. 4 and 5C). The heightwise and widthwise dimensions of the dispensing channel 42, the inlet 44, and the portal 46 can be selectively configured using the adjustment mechanisms 84, 85.

With reference to FIG. 4, the bin 40 includes a sensor system 88 including an exit photoemitter 88A, an exit photosensor or photodetector 88B, an entrance photoemitter 88C (FIG. 5A), an entrance photosensor or photodetector 88D, a sensor system controller (e.g., the controller 12 or a dedicated controller on the bin 40), and an emitter driver (not shown) operative to monitor flow of tablets T through the dispensing channel 42. The photoemitter 88A and the photosensor 88B may cooperate as a first sensor pair and the photoemitter 88C and the photosensor 88D may cooperate as a second sensor pair. Additionally, the first and second sensor pairs may be cooperatively used or monitored as disclosed in U.S. patent application Ser. No. 11/834,936, the disclosure of which is incorporated herein by reference.

The photodetectors 88B, 88D are mounted in the wall 81A. The photoemitters 88A, 88C are mounted in the wall 82A. The photodetector 88B and the photoemitter 88A are each positioned along and face the dispensing channel 42. According to some embodiments, the photodetector 88B and the photoemitter 88A are each positioned proximate (and, in some embodiments, at, in or immediately adjacent) the portal 46 and the photodetector 88D and the photoemitter 88C are each positioned proximate (and, in some embodiments, at, in or immediately adjacent) the inlet 44.

According to some embodiments, the photoemitters 88A, 88C are photoelectric emitters and the photodetectors 88B, 88D are photoelectric sensors. According to some embodiments, the photoemitters 88A, 88C are infrared (IR) emitters and the photodetectors 88B, 88D are IR photosensors. According to some embodiments, the photoemitters 88A, 88C are ultra-violet (UV) emitters and the photodetectors 88B, 88D are UV photodetectors. According to some embodiments, the components 88A, 88B, 88C, 88D may each include both a photoemitter and a photodetector, whereby the components 88A, 88B, 88C, 88D may each serve as an emitter and a sensor, each configured to emit toward and receive from the other in its sensor pair. According to some embodiments, the components 88A, 88C may each be replaced with a retroreflective photoemitter/photodetector device and the components 88B, 88D may each be a cooperating reflector. Other combinations and configurations including a photoemitter and an associated photodetector may be employed. For the purpose of explanation, the illustrated embodiment will be described with only the components 88B, 88D being a photodetector (i.e., the photodetectors 88B, 88D receive photoemissions from the photoemitters 88A, 88C, respectively).

According to still further embodiments, the photoemitters 88A, 88C and the photodetectors 88B, 88D may be radiation emitters and radiation detectors of other suitable types that emit and detect corresponding radiation. Other suitable types of emitter/detector pairs may include ultrasonic emitters/detectors or electric field (e-field) emitters/detectors.

The photodetectors 88B, 88D are configured and positioned to detect the tablets T as they pass through the dispensing channel 42. The photodetectors 88B, 88D are configured to generate detector signals that are proportional to the light received thereby. The photoemitter 88A is positioned and configured to generate light that is directed toward the photodetector 88B across the dispensing pathway of the tablets T. Similarly, the photoemitter 88C is positioned and configured to generate light that is directed toward the photodetector 88D across the dispensing pathway of the tablets T. In this manner, when a tablet T interrupts the light transmitted from the photoemitter 88A, 88C to the photodetector 88B, 88D, the detector signal will change based on the reduced light being received at the respective photodetector 88B, 88D.

According to some embodiments, the sensor system controller uses detection signals from one or both of the photodetectors 88B, 88D to count the dispensed tablets, to assess a tablet or tablets, and/or to determine conditions or performance in tablet dispensing. In some cases, the sensor system 88 operates the valves 72, 74 or other devices in response to identified or determined count, conditions or performance in dispensing. Suitable methods and operations are disclosed in co-assigned U.S. patent application Ser. No. 11/834,936, the disclosure of which is incorporated herein by reference.

The nozzle 60 includes a left part 62 and a right part 64. The nozzle 60 defines a passage 66B and an inlet 66A and an outlet 66C fluidly connected by the passage 66B. The inlet 66 is aligned with the portal 46 as shown in FIGS. 5B and 5C.

With reference to FIGS. 5B-5G, the gate system 100 includes a gate member or flap 110 and a crossbar 120. The gate member 110 includes a flap body 112 and a mount extension 114. Cutouts 114A, 114B are formed in the mount extension 114. The crossbar 120 defines a slot 122 and a front opening 122A communicating with the slot 122. The crossbar 120 has opposed prongs 124 that are received in bores 126 in the nozzle 60 to thereby secure the crossbar 120 in the nozzle 60. The mount extension 114 is captured in the slot 122 so that the flap body 112 depends from the crossbar 120.

The gate member 110 is formed of a flexible, resilient material. According to some embodiments, the gate member 110 is formed of a polymeric material. According to some embodiments, the gate member 110 is formed of an elastomeric material. Suitable materials for the gate member 110 may include polyurethane, EPDM, or butyl rubber. According to some embodiments, the gate member 110 has a Shore A hardness in the range of from about 20 to 90. According to some embodiments, the gate member 110 has a thickness in the range of from about 0.020 to 0.045 inch. According to some embodiments, the gate member 110 could have variable thickness, durometer, and/or density; such characteristics could be achieved by molding the part.

When the flap body 112 is in a closed position as shown in FIGS. 5A-5C, 5E and 5F, the flap body 112 covers the portal 46. As discussed hereinbelow, the flap body 112 can be deflected or transitioned away from the portal 46 into an open position.

According to some embodiments, the flap body 112 is elastically biased or preloaded against the side wall 56 (FIG. 4), which serves as the stopping surface, when the flap body 112 is at rest. For example, the crossbar 120 may be secured in the nozzle 60 such that the gate member 110 is disposed at a steeper rest angle than the corresponding angle of the side wall 56. The amount and profile of the preload can be tuned or configured by selection of characteristics of the gate member 110 as discussed hereinbelow, for example. By preloading the flap body 112, a softer durometer material can be used for the flap body 112 while still holding the tablets in the bin 40 when at rest.

Exemplary operation of the dispensing system 10 will now be described. The bin 40 is filled with tablets T to be dispensed. The tablets T may initially be at rest. At this time, the valves 72, 74 are closed so that no gas flow is provided through the drive jet outlets 72A, 74A or the agitation outlets 72B, 74B. The gate member 110 is in its closed position as shown in FIGS. 5B and 5C so that the portal 46 (and, therefore, the dispensing pathway) is blocked by the gate member 110. More particularly, the stiffness of the gate member 110 and/or its bias against the walls defining the portal 46 will prevent or inhibit tablets T from exiting the bin 40 through the portal 46.

If necessary, the adjustable dispensing channel subassembly 80 is suitably adjusted using the adjusters 84, 85 to provide the dispensing channel 42 and/or the inlet 44 with the appropriate dimensions for singulating the intended tablets T. Notably, such adjustment also alters the dimensions of the portal 46 but the gate member 110 nonetheless continues to fully cover the geometry of the portal 46 while in the closed position (FIG. 5C).

Figure 5D:
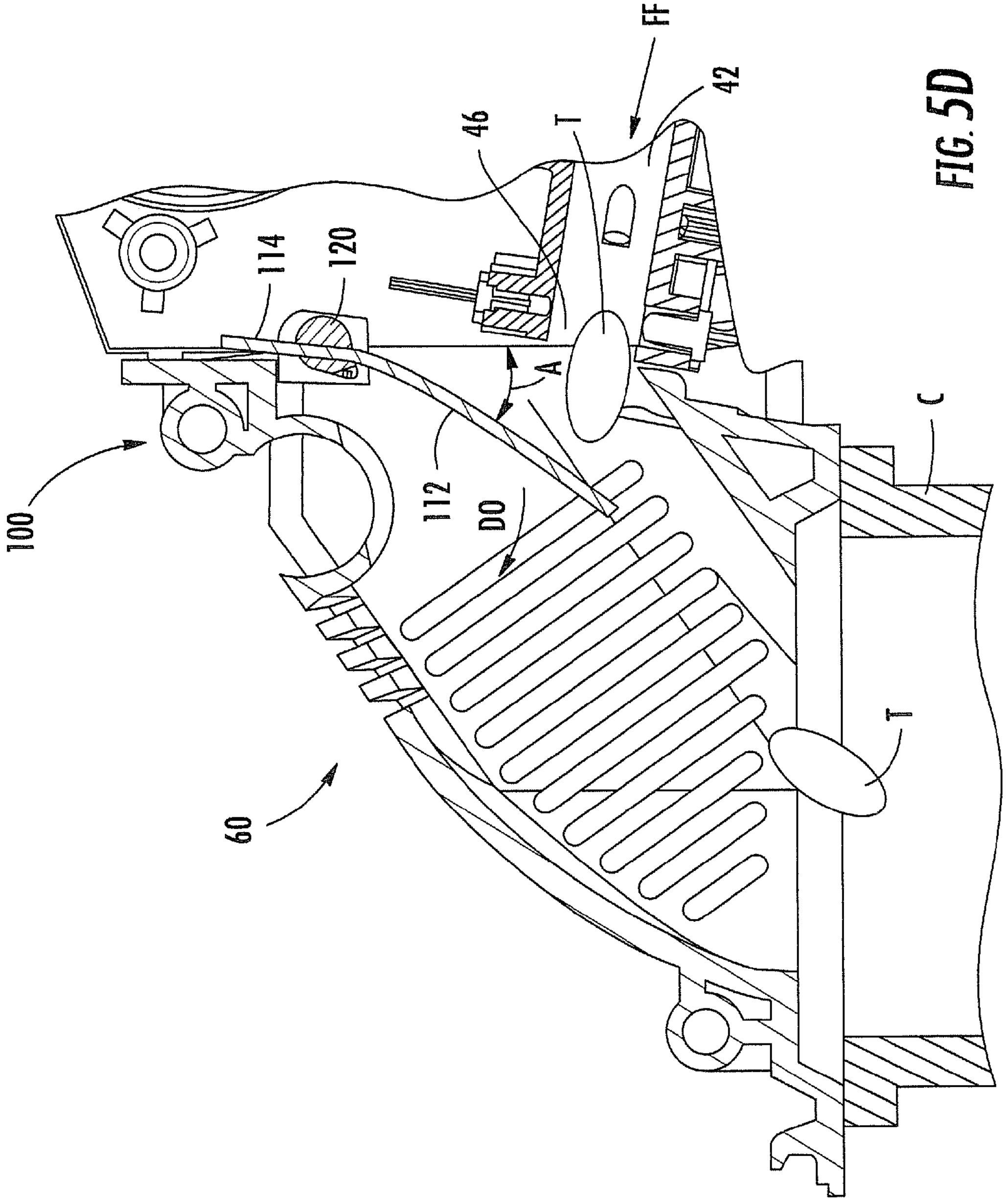
FIG. 5D is an enlarged, fragmentary cross-sectional view of the bin of FIG. 3 wherein the gate member is in an open position and tablets are being dispensed in a forward or dispensing direction.
Figure 5E:
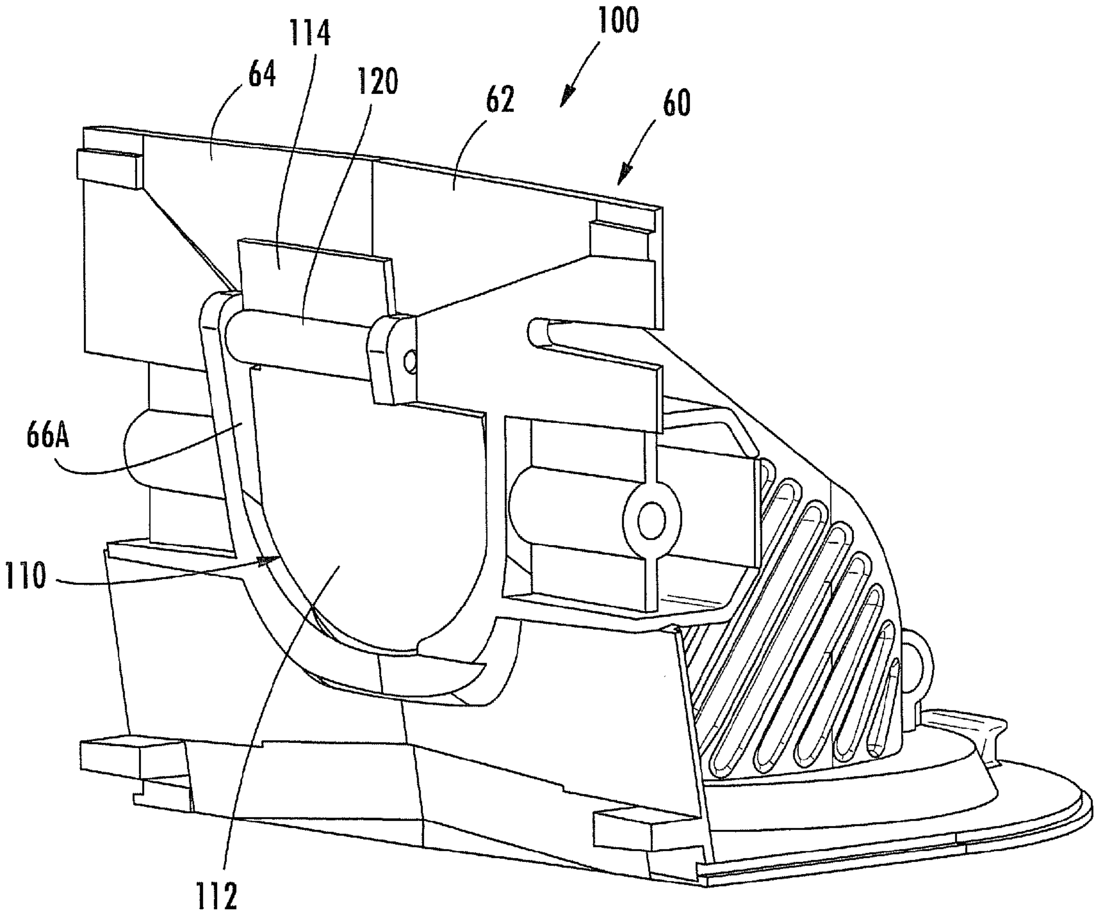
FIG. 5E is a rear perspective view of a nozzle and the gate system of the bin of FIG. 3, wherein the gate member is in the closed position.
Figure 5F:
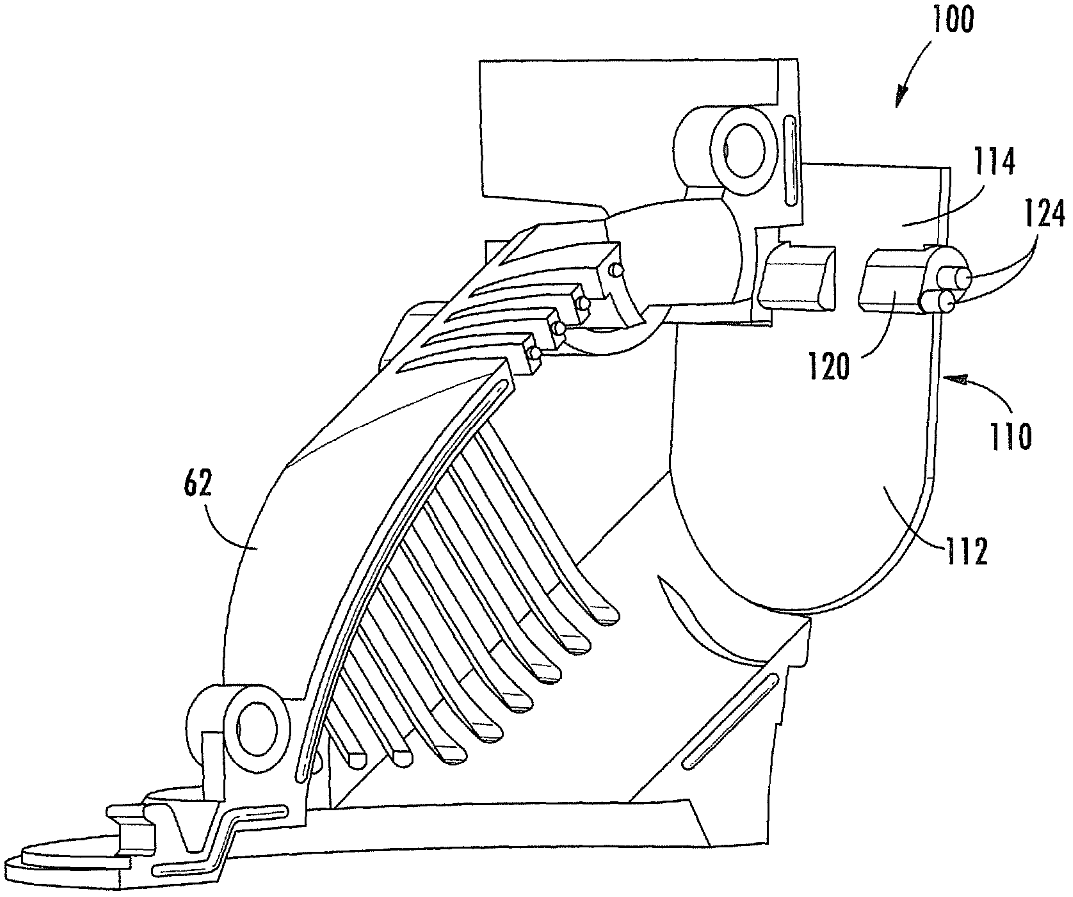
FIG. 5F is a front perspective view of the nozzle and the gate system of FIG. 5E, wherein a portion of the nozzle is removed for clarity.
Figure 5G:
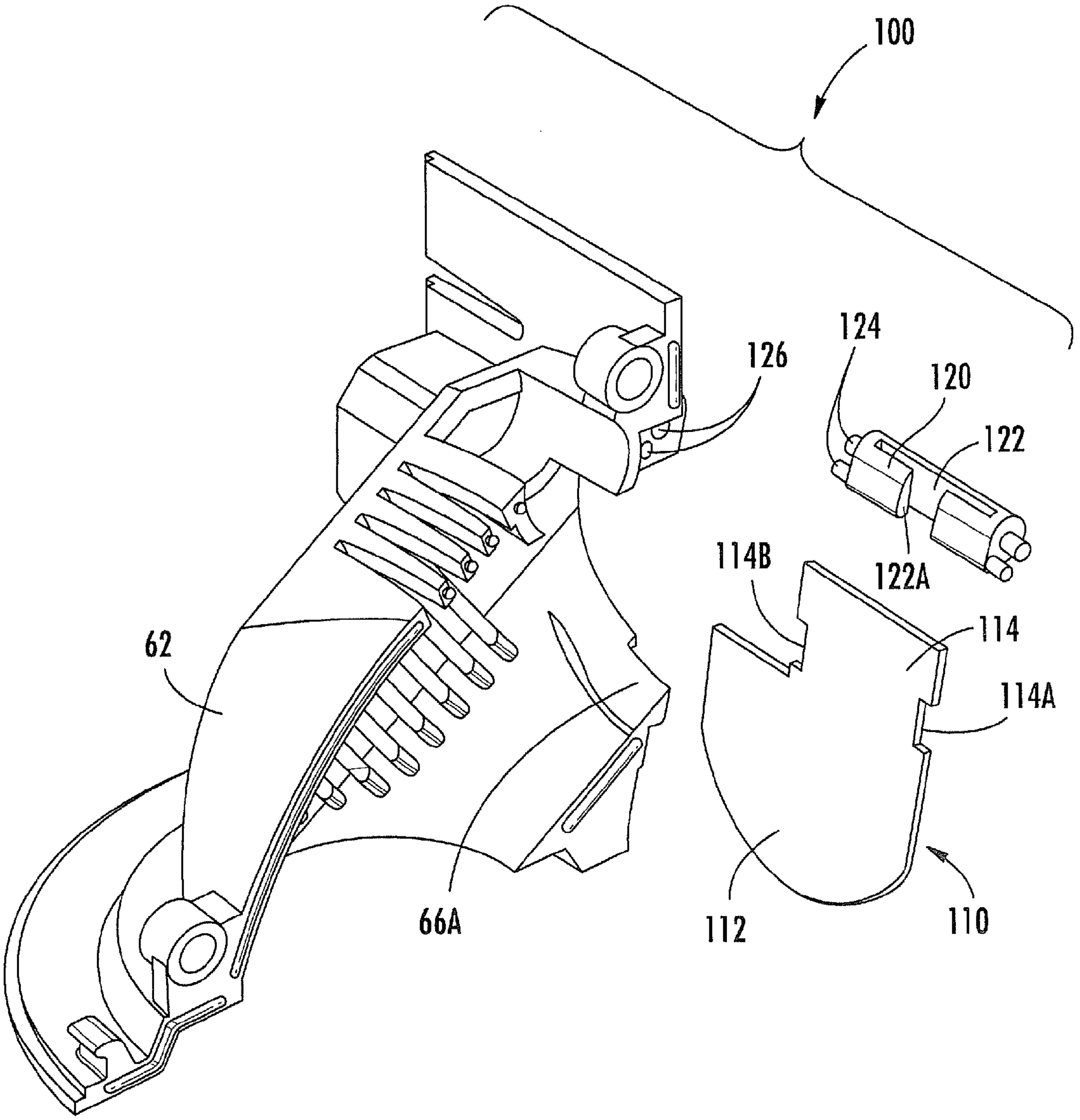
FIG. 5G is an exploded, front perspective view of the nozzle and the gate system of FIG. 5E, wherein a portion of the nozzle is removed for clarity.

When it is desired to dispense the tablets T to fill the container C, the dispensing carrier 26, directed by the controller 12, moves the container C to the exit port 66C of the nozzle 60 of the selected dispensing bin 40. The controller 12 signals the forward valve 72 to open (while the reverse valve 74 remains closed). The opened valve 72 permits the pressurized gas from the gas source G to flow through the gas supply passages and out through the forward drive jet outlets 72A. The pressurized flow from the drive jet outlets 72A creates high velocity gas jets that generate suction that causes a forward flow FF of high pressure, high velocity air to be drawn outwardly through the dispensing channel 42 (FIG. 5D).

The gate member 110 is forcibly deflected by the forward flow FF and thereby moved, deflected, or transitioned to its open position. In this way, the pathway through the portal 46 is opened. The transitioning of the gate member 110 to the open position (from the closed position) may be characterized as passively transitioning in that no solenoid or other actuator acts on gate member 110 to effect the transition or movement. The gate member 110 is thus actuated or opened using the already supplied and present energy of the air flow FF.

When the gate member 110 is open, the angle of deflection A of the gate member 110 from its closed position may vary depending on the pressure of the air flow FF and the size of the portal 46. According to some embodiments, the angle of deflection A (FIG. 5D) is in the range of from about 5 to 90 degrees.

Tablets T are oriented into a preferred orientation by the shape of the inlet 44 to the dispensing channel 42 and dispensed into the container C through the dispensing channel 42 and the portal 46 under the force of the forward flow FF. The dispensed tablets T pass by the open gate member 110.

In some cases, some or all of the tablets T may strike the gate member 110 on their way into and/or through the nozzle 60. In this way, the gate member 110 may absorb or dissipate a portion of the kinetic energy of the tablets T so that they do not strike the nozzle 60 or strike the nozzle 60 with less force, thereby reducing impact damage to the tablets T that may otherwise occur. Similarly, this energy dissipation may reduce the tendency of the tablets to bounce as they are introduced into the container C.

The opening of the valve 72 also simultaneously permits the pressurized supply gas from the gas source G to flow through the front agitation outlet 72B to loft or otherwise displace (i.e., agitate) the tablets T in the hopper 52 proximate the inlet 44. The photodetectors 88B, 88D detect the tablets T as they pass through respective predetermined points in the dispensing channel 42.

Once dispensing is complete (i.e., a predetermined number of tablets has been dispensed and counted), the controller 12 activates the forward valve 72 to close and the reverse valve 74 to open. The opened valve 74 permits the pressurized gas from the gas source G to flow out through the reverse drive jet outlet 74A. The pressurized flow from the drive jet outlet 74A creates a high velocity gas jet that generates suction that causes a reverse (i.e., rearward) flow FR (FIG. 5B) of high pressure air to be drawn inwardly through the dispensing channel 42 toward the chamber 52. In this manner, the airflow is reversed, and the gate member 110 is forcibly drawn upstream back into the closed position by the reverse flow FR. The pathway through the portal 46 is thereby closed. The elastic bias of the gate member 110 may also serve to transition the gate member 110 back to the closed position. The reverse flow FR may deflect the gate member 110 upstream toward the portal 46 and the gate member 110 may brace against a portion of the nozzle 60 or the dispensing channel subassembly 80 to limit inversion of the gate member 110. The transitioning of the gate member 110 to the closed position (from the open position) may be characterized as passively transitioning in that no solenoid or other actuator acts on gate number one tend to effect the transition or movement. The gate member 110 is thus actuated or closed using the already supplied and present energy of the air flow FR.

In addition to closing the gate member 110, any tablets T remaining in the channel 42 are returned to the chamber 52 under the force of the reverse flow FR (FIG. 5B). Notably, the closing of the gate member 110 may occur relatively quickly, so that a tablet or tablets T having sufficient momentum or inertia to otherwise escape through the portal 46 will be blocked by the gate member 110 and returned to the hopper chamber 52.

The opening of the valve 74 also simultaneously permits the pressurized supply gas from the gas source G to flow through the rear agitation outlet 74B to agitate the tablets T in the hopper 52.

During a dispensing cycle (i.e., when the forward flow FF is being generated), the controller 12 may determine that a tablet jam condition is or may be present. A tablet jam is a condition wherein one or more tablets are caught up in the bin 40 such that tablets T will not feed into or through the dispensing channel 42 under the pass of the forward flow FF. Tablets may form a jam at the nozzle inlet 44, one of the choke points or elsewhere so that no tablets are sensed passing through the dispensing passage 42 for a prescribed period of time while the forward air flow FF is being generated. Controller 12 will close the forward valve 72 and open the reverse valve 74 as described above for generating the reverse air flow FR and the rear agitation flow to clear a perceived tablet jam. These air flows may serve to dislodge any such jams as well as to loosen the tablets in the hopper 52. As discussed above, the reverse air flow FR will serve to transition the gate member 110 into the closed position. In some embodiments, the gate member 110 may have throughholes defined in the flap body 112 to aid in the reverse flow operation. The throughholes may be of any size or number.

While, in the foregoing description, the controller 12 controls the valves 72, 74, the valves 72, 74 may alternatively be controlled by a local controller unique to each bin 40.

Typically, an operator will request that a desired number of tablets be dispensed ("the requested count"). The sensor system 88 detects the tablets T as they pass through predetermined points in the dispensing channel 42, as discussed in more detail below. The controller 12 uses the detection signals from the photodetector 88B and/or the photodetector 88D to monitor and maintain a registered count of the tablets T dispensed ("the system count"). When the system count matches the requested count, the controller 12 will deem the dispensing complete and cease dispensing of the tablets T.

When the bin 40 is not in use and neither flow FF, FR is present, the gate member 110 will reside in the closed position as shown in FIG. 5B. The gate member 110 will serve to prevent the escape of tablets T through the portal 46. This may serve to prevent accidental (e.g., due to shaking during transport or installation) or deliberate loss of tablets from the bin 40. In particular, when the gate system 100 is used in combination with a fill door 58 having a lock mechanism 59 or other means for otherwise sealing the bin 40, the bin 40 may be secured against theft of or tampering with the tablets T.

According to some embodiments and as illustrated, the nozzle 60 and gate system 100 are constructed as a modular unit that may be operatively mounted on a bin housing 50 without requiring further modification of the bin housing 50. For example, a nozzle 60 incorporating a gate system as disclosed herein may simply be interchanged with a nozzle of another design (e.g., not having a gate system). Moreover, by mounting the modular gate system 100 fully downstream of the dispensing channel, the gate member 110 can accommodate a range of adjustments to the size of the portal 46 without adjustment or modification to the gate system 100.

Figure 6A:
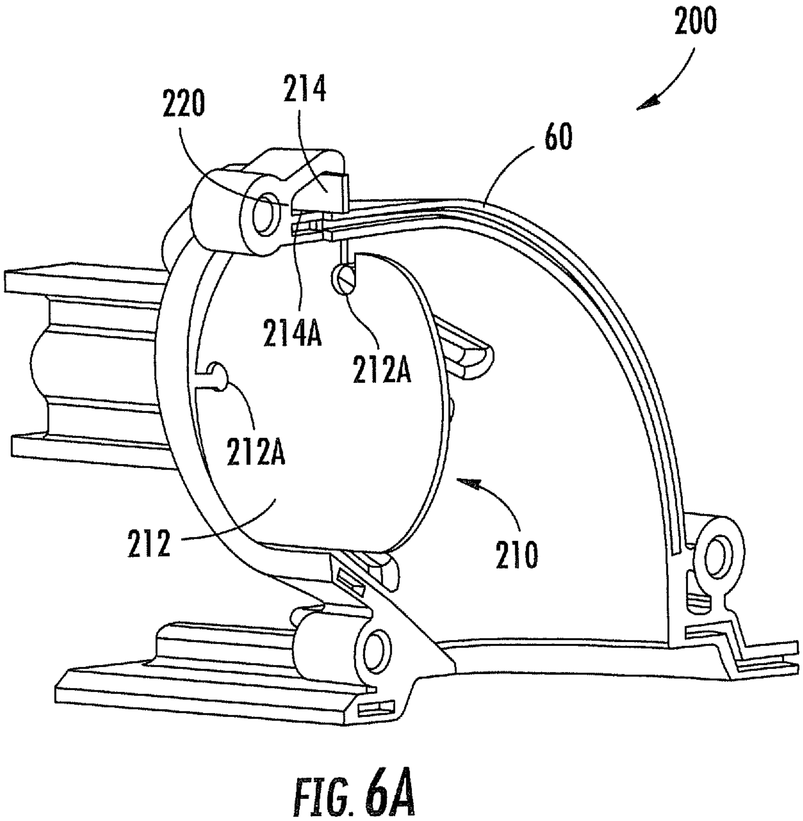
FIG. 6A is a rear perspective view of a nozzle and a gate system according to further embodiments of the present invention, wherein a gate member thereof is in a closed position and a portion of the nozzle is removed for clarity.
Figure 6B:
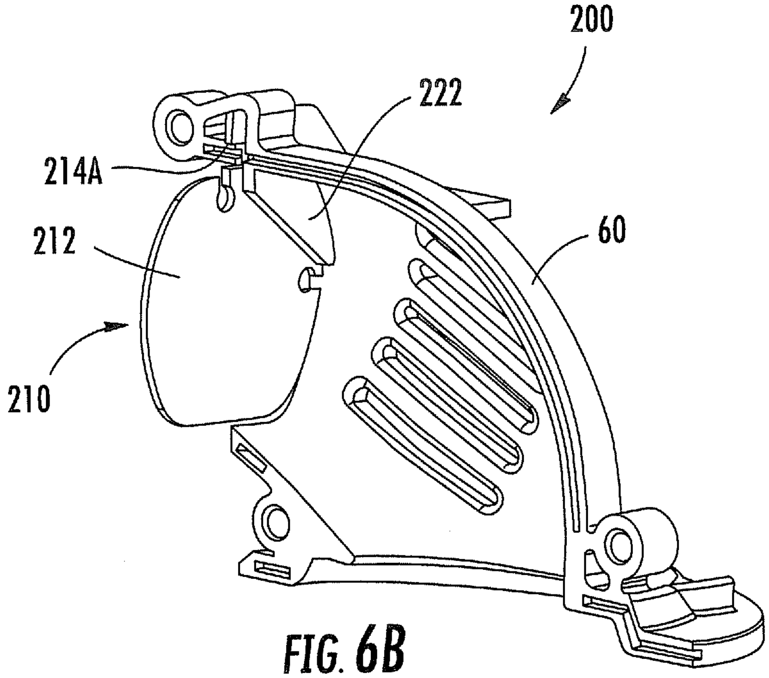
FIG. 6B is a front perspective view of the nozzle and the gate system of FIG. 6A, wherein a portion of the nozzle is removed for clarity.

With reference to FIGS. 6A and 6B, a gate system 200 according to further embodiments of the present invention is shown therein. The gate system 200 may be installed on the bin 40 in place of the gate system 100 and will operate in a similar manner except as follows. The gate assembly 200 includes a gate member or flap 210 formed of a flexible, resilient material as discussed above with regard to the gate member 110. The gate member 210 includes a flap body 212 and a mount extension 214. Cutouts or notches 212A are defined in the flap body 212. A slot 214A is defined in the mount extension 214. The mount extension 214 is inserted through a mount slot 220 formed in the nozzle 60 such that a portion of the nozzle 60 is received in the slot 214A and the mount extension 214 is directly captured and supported by the nozzle 60. The nozzle 60 further includes a brace wall 222 on the downstream side of the flap body 212. In use, the gate member 210 transitions between open and closed positions in the same manner as described above with regard to the gate member 110. The brace wall 222 can define the zone in which the gate member 210 is permitted to bend to ensure the gate member 210 bends in a straight line between the notches 212A.

Figure 7A:
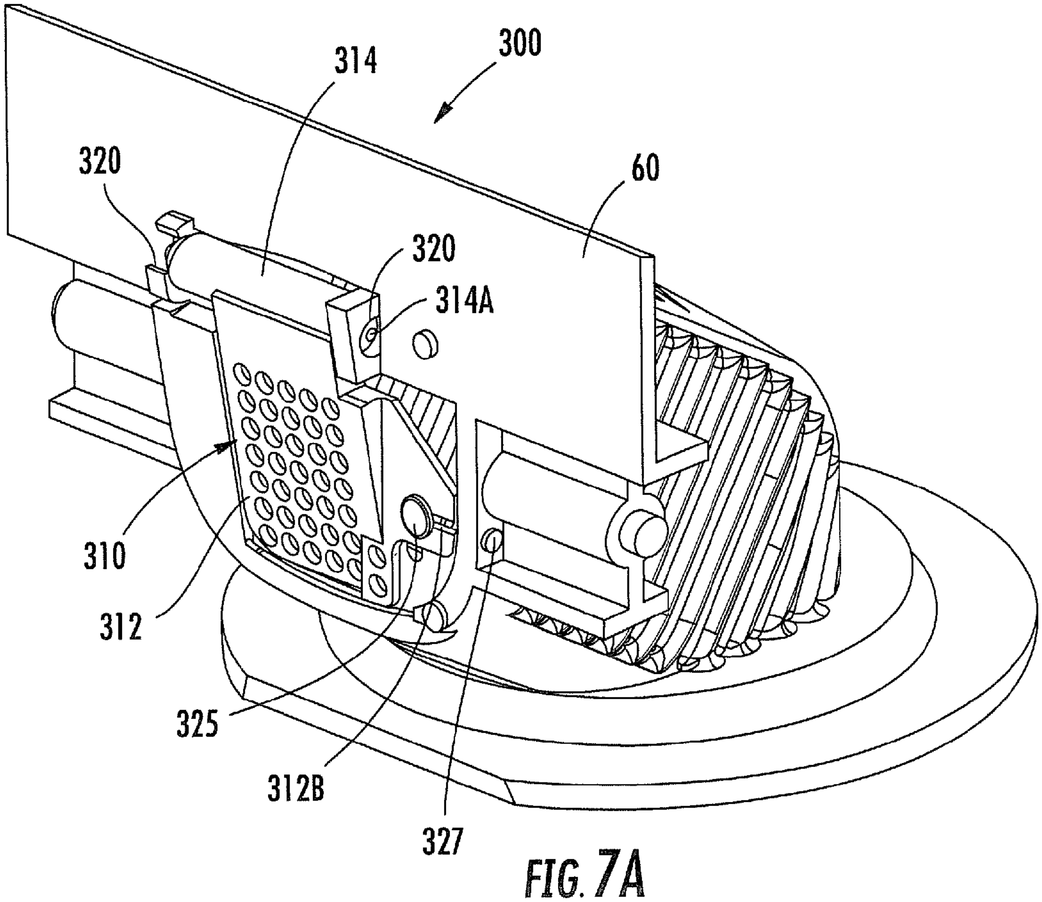
FIG. 7A is a rear perspective view of a nozzle and a gate system according to further embodiments of the present invention, wherein a gate member thereof is in a closed position.
Figure 7B:
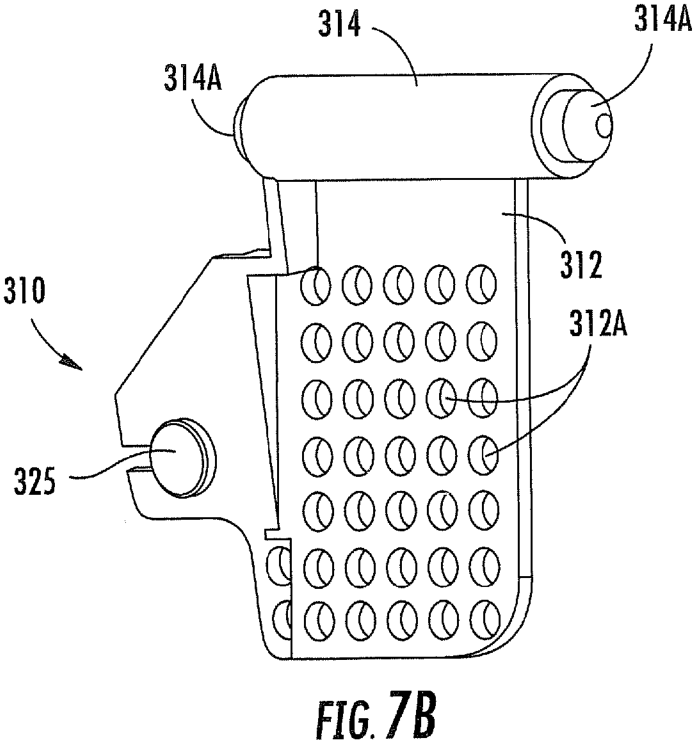
FIG. 7B is a front perspective view of a gate member of the gate system of FIG. 7A.

With reference to FIGS. 7A and 7B, a gate system 300 according to further embodiments of the present invention is shown therein. The gate system 300 may be installed on the bin 40 in place of the gate system 100 and will operate in a similar manner except as follows. The gate assembly 300 includes a gate member or panel 310 formed of a substantially rigid material. According to some embodiment, the gate member 310 is formed of a polymeric material. Suitable materials for the gate member 310 may include polycarbonate, polyurethane or polypropylene. The gate member 310 includes a panel body 312 and a mount extension 314. Throughholes 312A and a magnet slot 312B are defined in the panel body 312. Prongs 314A extend from the mount extension 314 and are pivotally mounted in hinge bores 320 defined in the nozzle 60. A first magnet 325 is secured in the slot 312B and a second magnet or ferrous material 327 is secured in the nozzle 60. Alternatively, the second magnet may be mounted in the side wall 56 (FIG. 4; e.g., in the forward facing face of the side wall 56), which is overlapped by the left side portion of gate member 310 when the gate member 310 is in the closed position. Any combination of magnet-magnet or magnet-ferrous material may be employed, such as other embodiments where a magnet is located in the side wall 56 and a ferrous object is located on the panel body 312 or the panel body 312 is made of a ferrous material. In use, the gate member 310 transitions between open and closed positions in the same manner as described above with regard to the gate member 110, except that the panel body 312 pivots about the prongs 314A (rather than elastically bending) and the panel body 312 is positively biased into the closed position by the mutual attraction between the magnets 325, 327. The sizes and patterns of the throughholes 312A may be selected to tune the performance of the gate member 312.

Figure 8A:
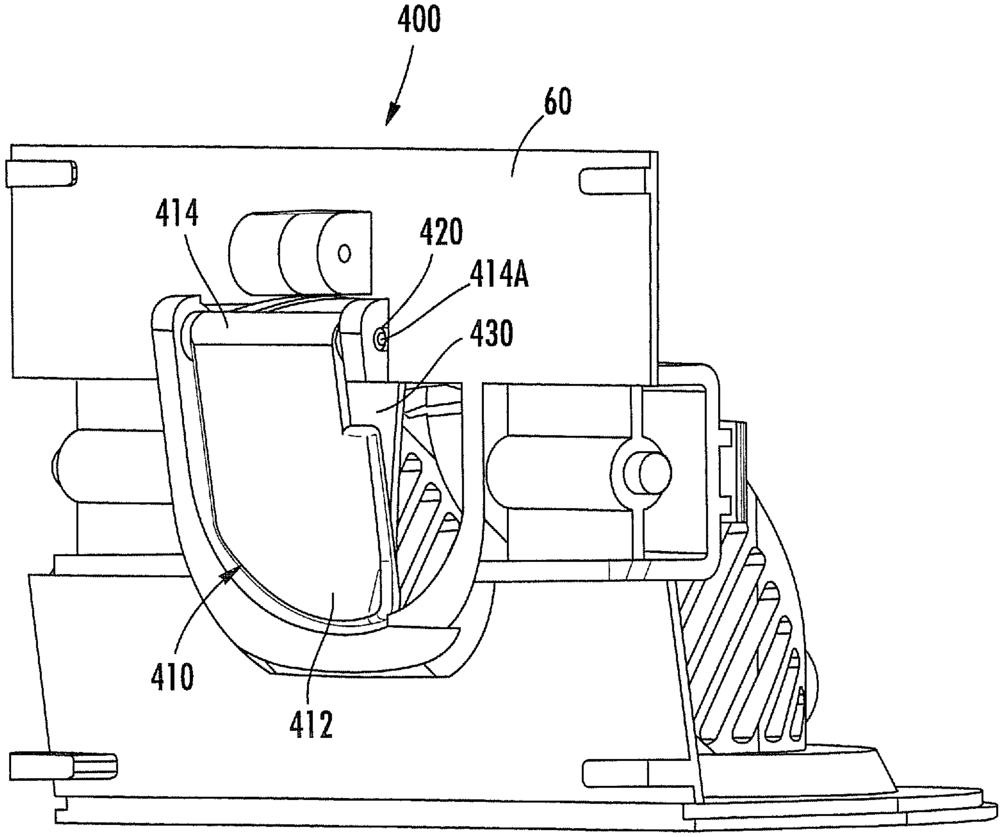
FIG. 8A is a rear perspective view of a nozzle and a gate system according to further embodiments of the present invention, wherein a gate member thereof is in a closed position.
Figure 8B:
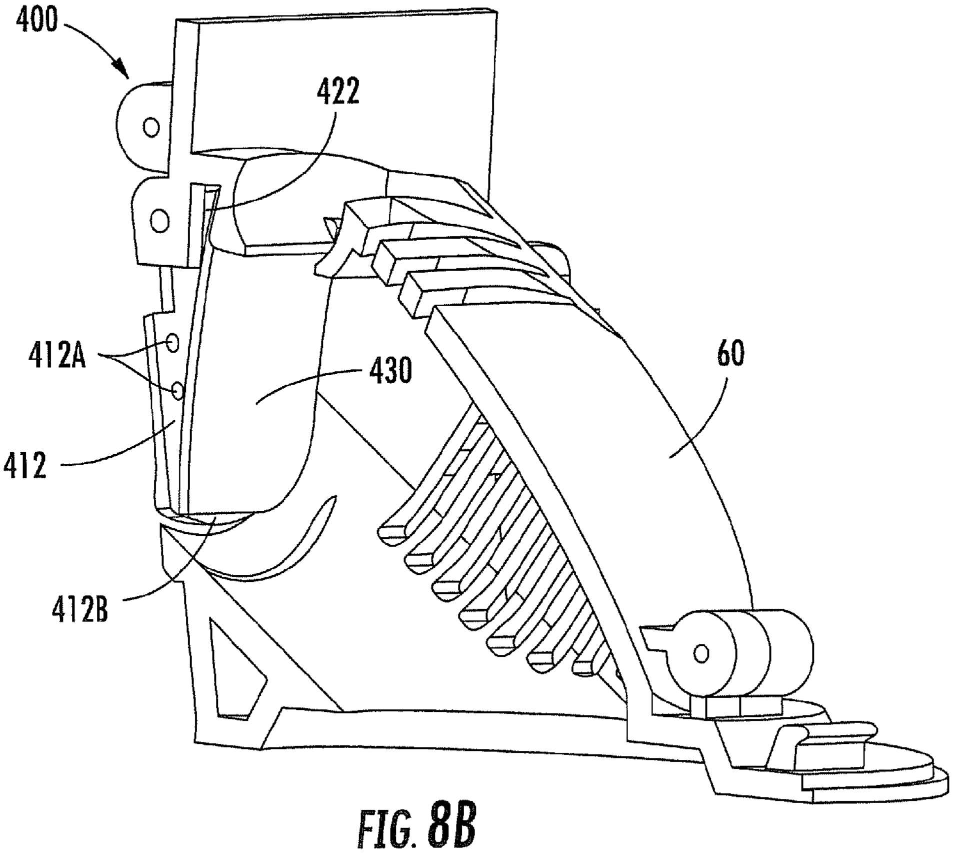
FIG. 8B is a front perspective view of the nozzle and the gate system of FIG. 8A, wherein a portion of the nozzle is removed for clarity.
Figure 8C:
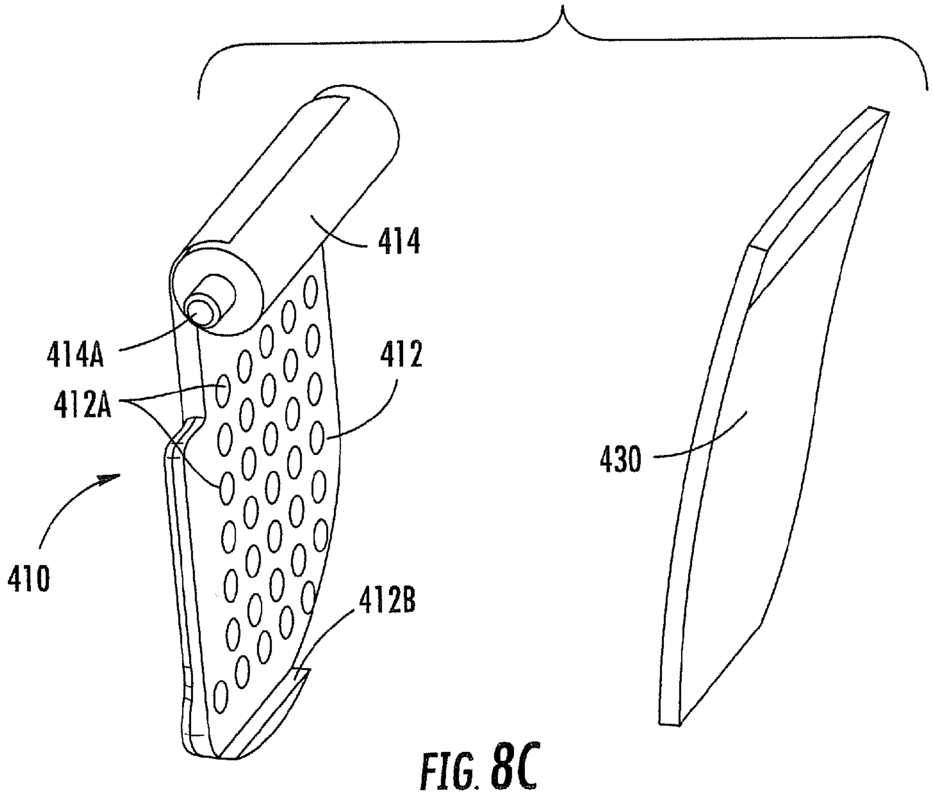
FIG. 8C is an exploded, perspective view of a gate member and a spring flap of the gate system of FIG. 8A.

With reference to FIGS. 8A-8C, a gate system 400 according to further embodiments of the present invention is shown therein. The gate system 400 may be installed on the bin 40 in place of the gate system 300 and will operate in a similar manner except as follows. The gate assembly 400 includes a gate member or panel 410 formed of a substantially rigid material. The gate member 410 includes a panel body 412 and a mount extension 414. The panel body 412 includes perforations 412A and a lower flange 412B. Prongs 414A extend from the mount extension 414 and are pivotally mounted in hinge bores 420 defined in the nozzle 60. A spring flap 430 is positioned downstream of the panel body 412. The upper end of the spring flap 430 is received in a slot 422 in the nozzle 60 and the lower end of the spring flap 430 abuts the flange 412B. The spring flap 430 is formed of a flexible, resilient material. According to some embodiments, the spring flap 430 is formed of a polymeric material. According to some embodiments, the spring flap 430 is formed of an elastomeric material. Suitable materials for the spring flap 430 may include polyurethane, EPDM, or butyl rubber.

In use, the gate member 410 transitions between open and closed positions in the same manner as described above with regard to the gate member 110, except that the panel body 412 pivots about the prongs 414A (rather than elastically bending) and the panel body 412 is positively biased into the closed position by the spring flap 430. The spring flap 430 will elastically deform or deflect under the force of the forward flow FF. When closed, a left side portion of the panel body 412 overlaps the side wall 56 (FIG. 4). In some embodiments, a torsion or hair-pin type spring may be used to bring the gate member 410 to the closed position.

Figure 9A:
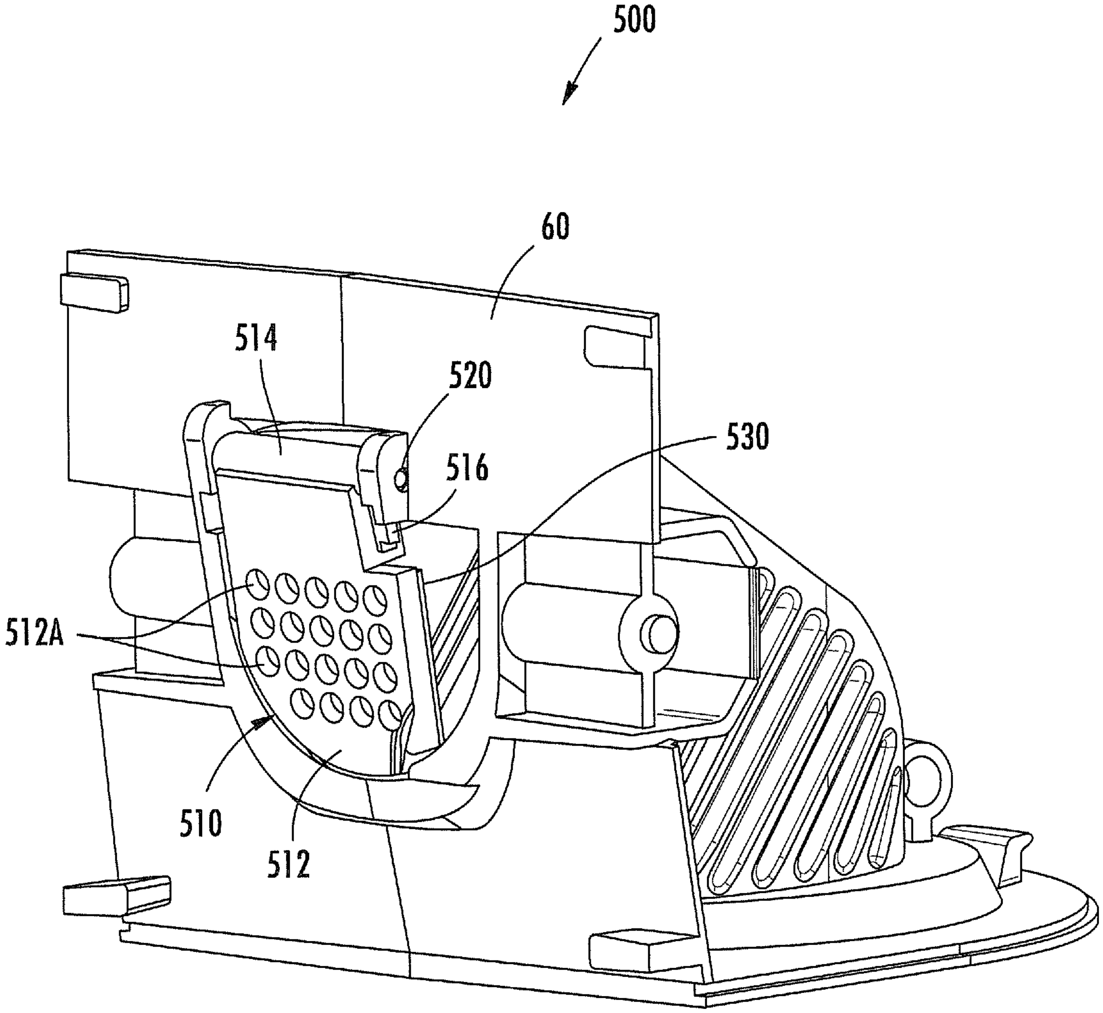
FIG. 9A is a rear perspective view of a nozzle and a gate system according to further embodiments of the present invention, wherein a gate member thereof is in a closed position.
Figure 9B:
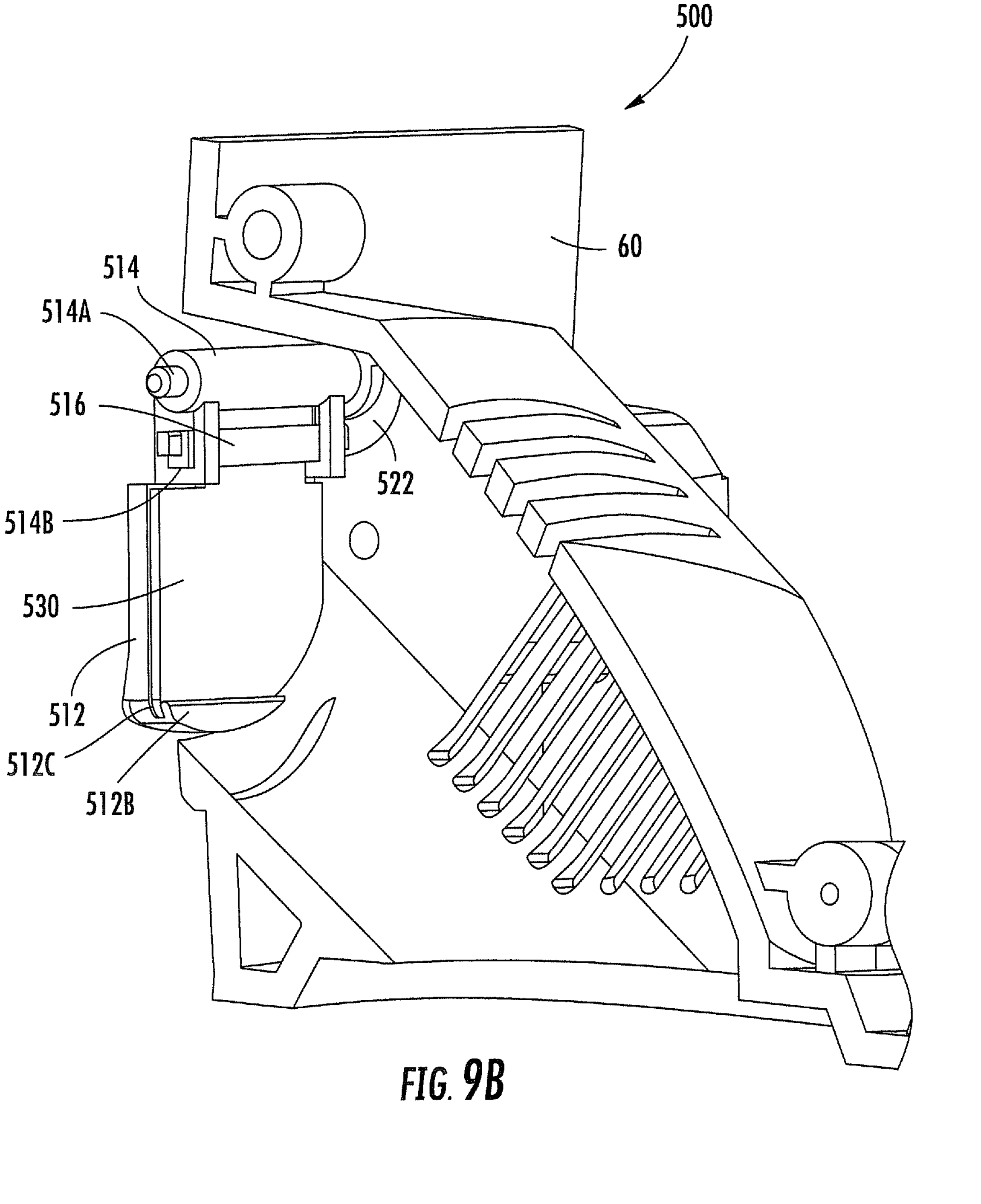
FIG. 9B is a front perspective view of the nozzle and the gate system of FIG. 9A, wherein a portion of the nozzle is removed for clarity.
Figure 9C:
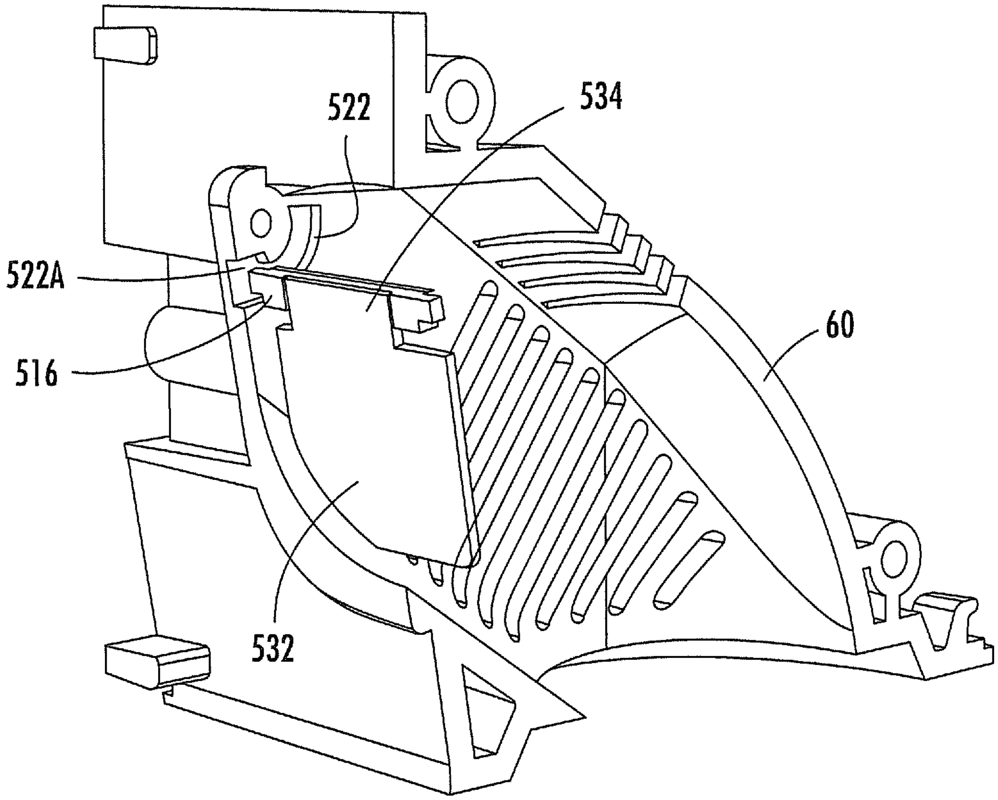
FIG. 9C is a rear perspective view of the nozzle and the gate system of FIG. 9A, wherein a portion of the nozzle and the gate member are removed for clarity.
Figure 10A:
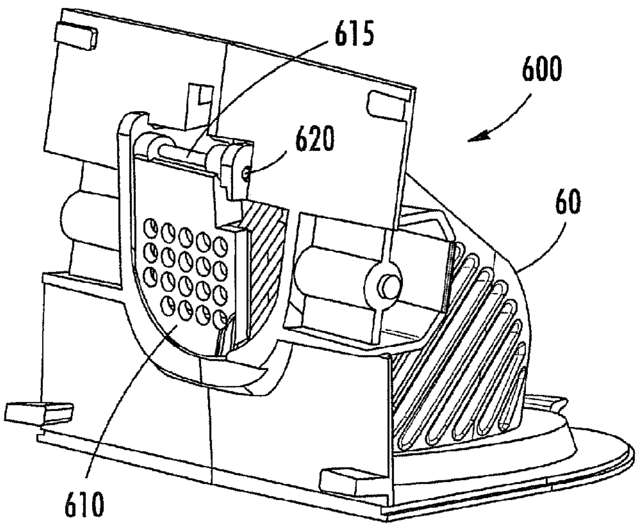
FIG. 10A is a rear perspective view of a nozzle and a gate system according to further embodiments of the present invention, wherein a gate member thereof is in a closed position.
Figure 10C:
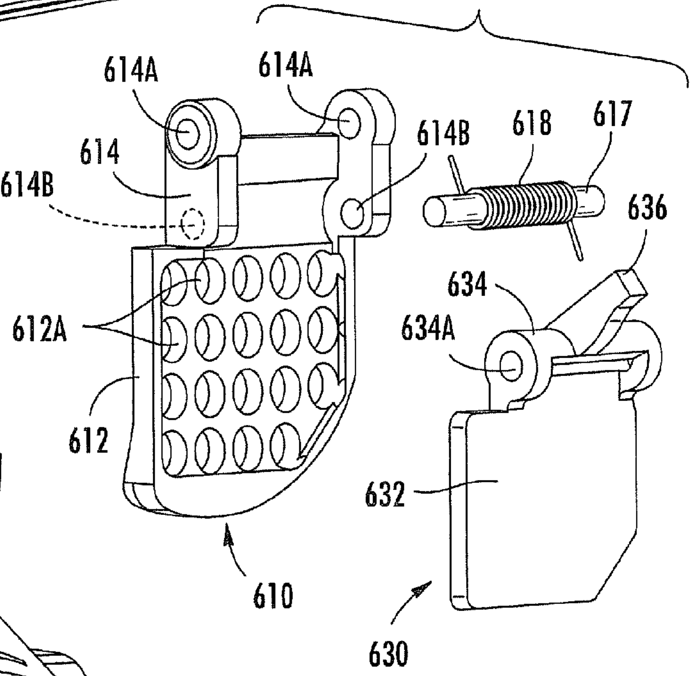
FIG. 10C is an exploded, perspective view of a gate member and a latch panel of the gate system of FIG. 10A.
Figure 10B:
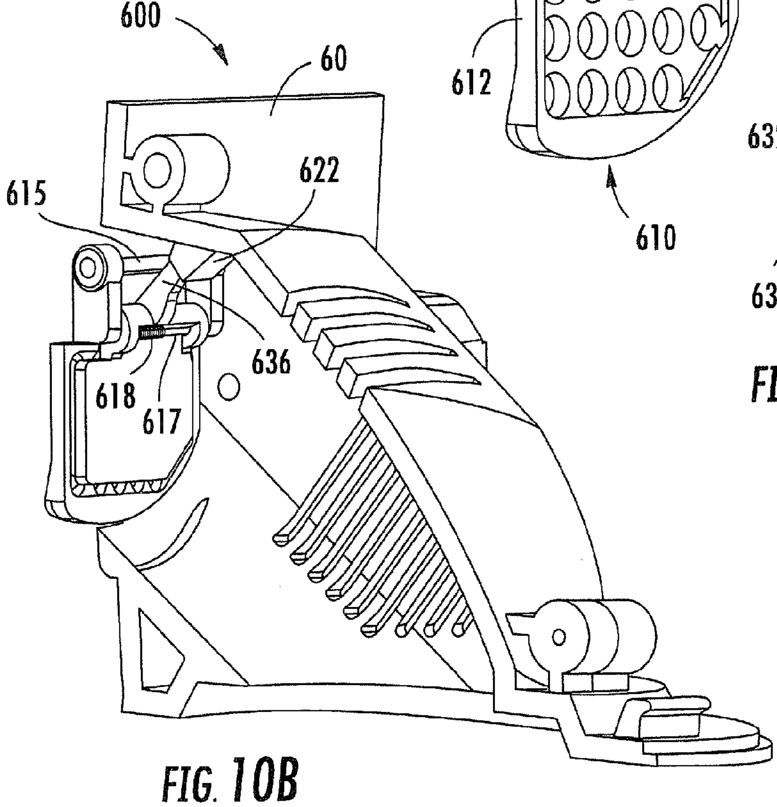
FIG. 10B is a front perspective view of the nozzle and the gate system of FIG. 10A, wherein a portion of the nozzle is removed for clarity.
Figure 10D:
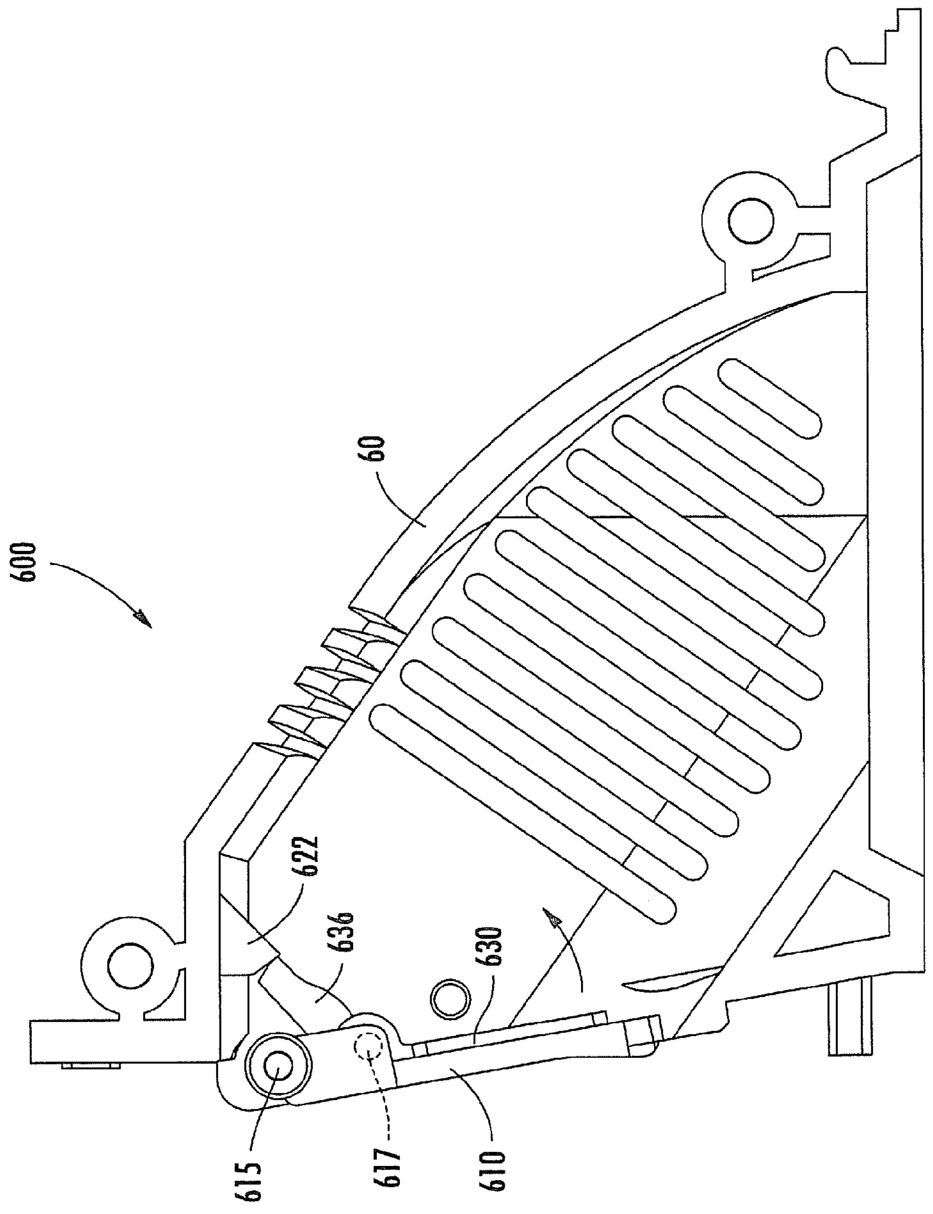
FIG. 10D is a side view of the nozzle and the gate system of FIG. 10A, wherein a portion of the nozzle is removed for clarity.

With reference to FIGS. 9A-9C, a gate system 500 according to further embodiments of the present invention is shown therein. The gate system 500 may be installed on the bin 40 in place of the gate system 300 and will operate in a similar manner except as follows. The gate assembly 500 includes a gate member or panel 510 formed of a substantially rigid material. The gate member 510 includes a panel body 512 and a mount extension 514. The panel body 512 includes throughholes 512A and a lower flange 512B. Prongs 514A extend from the mount extension 514 and are pivotally mounted in hinge bores 520 defined in the nozzle 60. The mount extension 514 also includes slots 514B.

A latch flap 530 is positioned downstream of the panel body 512. The latch flap 530 includes a flap body 532 and a mount extension 534. According to some embodiments, the latch flap 530 is formed of an elastomeric material. Suitable materials for the latch flap 530 may include polyurethane, EPDM, or butyl rubber.

The mount extension 534 is secured to a latch member or bar 516. The lower edge of latch flap 530 is fixed in a groove 512C defined by the flange 512B. The latch bar 516 is mounted in the slots 514B to permit relative vertical movement of the latch bar 516. An end of the latch bar 516 is slidably mounted in an arcuate slot 522 defined in the nozzle 60. The slot 522 includes a latch portion 522A on its upstream end.

In use, the gate member 510 transitions between open and closed positions in the same manner as described above with regard to the gate member 310, except that a latch mechanism comprising the latch flap 530, the latch bar 516, the latch portion 522A and the slots 514B serves to positively lock the gate member 510 in the closed position. When closed, a left side portion of the panel body 512 overlaps the side wall 56 (FIG. 4). When the bin 40 is at rest, the latch flap 530 resides substantially flat against the gate member 510 and biases the latch bar 516 into the latch portion 522A, where the latch bar 516 interlocks with the nozzle 60 to prevent the gate member 510 from swinging open. When the forward flow FF is initiated, the forward flow FF will pass through the throughholes 512A and deflect the latch flap 530. The deformation of the latch flap 530 causes the latch flap 530 to draw the latch bar 516 downward in the slots 514B and out of the latch portion 522A. The gate member 510 is then permitted to swing into the open position under the force of the forward flow FF. Upon cessation of the forward flow FF (which may include initiation of the reverse flow FR), the gate member 510, the latch flap 530 and the latch bar 516 will return to their initial positions to again interlock the latch bar 516 with the nozzle 60.

With reference to FIGS. 10A-10D, a gate system 600 according to further embodiments of the present invention is shown therein. The gate system 600 may be installed on the bin 40 in place of the gate system 300 and will operate in a similar manner except as follows. The gate assembly 600 includes a gate member or panel 610 formed of a substantially rigid material. The gate member 610 includes a panel body 612 and a mount extension 614. The panel body 612 includes throughholes 612A. Primary mount holes 614A and secondary mount holes 614B are defined in the mount extension 614. A primary pivot pin 615 extends through the primary mount holes 614A and is pivotally received in hinge bores 620 defined in the nozzle 60.

A substantially rigid latch panel 630 is positioned downstream of the panel body 612. The latch panel 630 includes a panel body 632, a mount extension 634 and a latch prong 636. According to some embodiments, the latch panel 630 is formed of a polymeric material. Suitable materials for the latch panel 630 may include polycarbonate, polyurethane or polypropylene. The latch panel 630 is pivotally coupled to the gate member 610 by a secondary pivot pin 617 that extends through the secondary mount holes 614B and mount holes 634A in the mount extension 634 to enable the latch panel 630 to pivot away from the gate member 610 about the pivot pin 617. A biasing member (e.g., a torsion spring) 618 is mounted on the pivot pin 617 and biases the latch panel 630 toward the gate member 610.

In use, the gate member 610 transitions between open and closed positions in the same manner as described above with regard to the gate member 310, except that a latch mechanism comprising the latch panel 630, the latch prong 636, and a latch stop structure 622 on the nozzle 60 serves to positively lock the gate member 610 in the closed position. When the bin 40 is at rest, the latch panel 630 resides substantially flat against the gate member 610, which places the latch prong 636 closely adjacent or in abutment with the stop structure 622. In this manner, the gate member 610 is prevented from opening by the interlock between the latch prong 636 and the stop structure 622. When the forward flow FF is initiated, the forward flow FF will pass through the throughholes 612A and force the latch panel 630 to swing forwardly about the pivot pin 617 (against the load of the spring 618) as indicated by the arrow in FIG. 10D. The forward displacement of the latch flap 630 swings the integral latch prong 636 upwardly and rearwardly out of engagement with the stop structure 622. The gate member 610 is then permitted to swing into the open position under the force of the forward flow FF. Upon cessation of the forward flow FF (which may include initiation of the reverse flow FR), the gate member 610 and the latch panel 630 will return to their initial positions to again interlock the latch prong 636 with the stop structure 622. Optionally, the spring 618 may be omitted.

Figure 11:
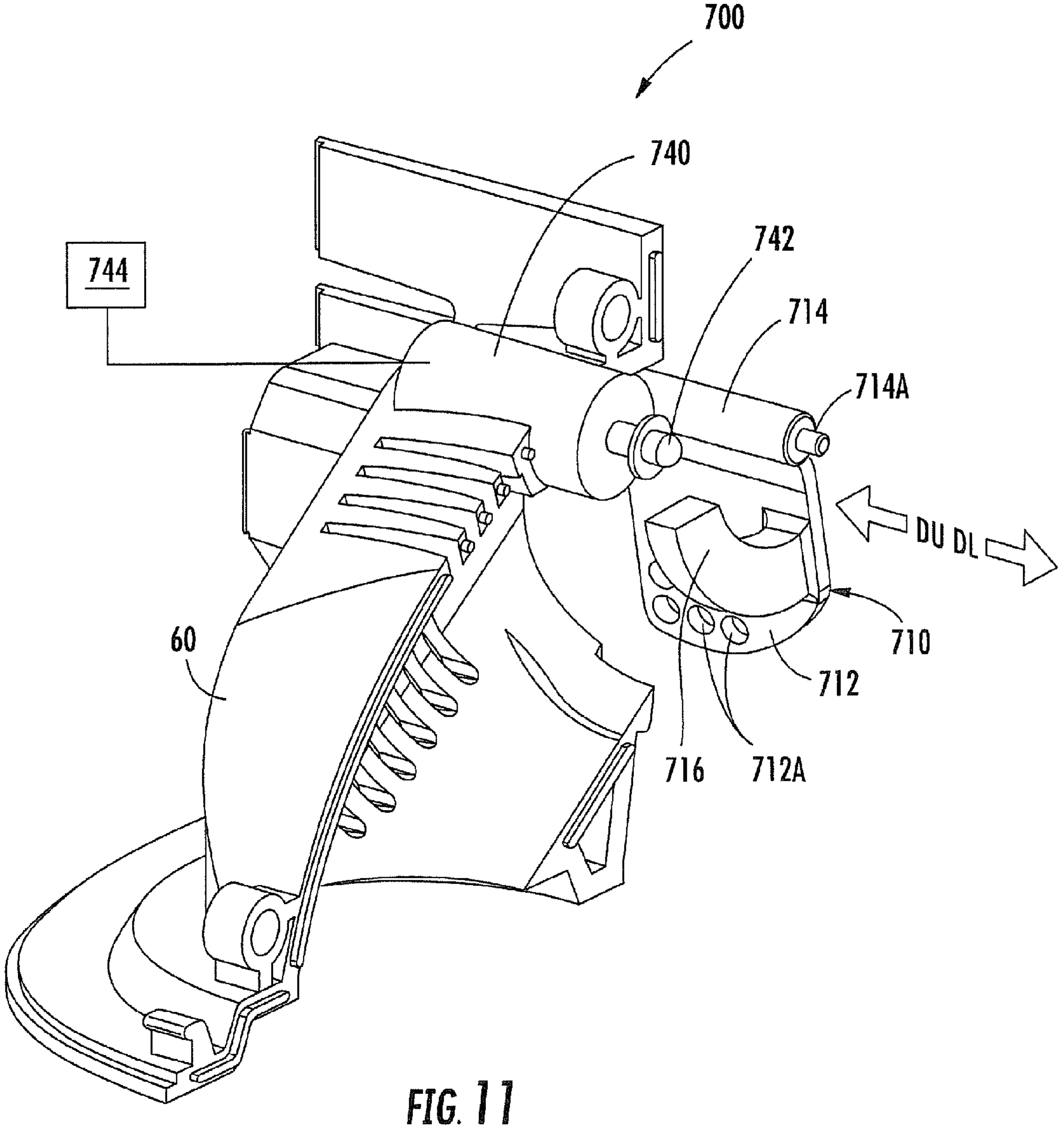
FIG. 11 is a front perspective view of a nozzle and a gate system according to further embodiments of the present invention, wherein a gate member thereof is in a closed position.

With reference to FIG. 11, a gate system 700 according to further embodiments of the present invention is shown therein. The gate system 700 may be installed on the bin 40 in place of the gate system 300 and will operate in a similar manner except as follows. The gate assembly 700 includes a gate member or panel 710 formed of a substantially rigid material. The gate member 710 includes a panel body 712, a mount extension 714, and a latch prong 716. The panel body 712 includes throughholes 712A. Prongs 714A extend from the mount extension 714 and are pivotally mounted in hinge bores (not shown) defined in the nozzle 60.

A latch actuator such as a solenoid 740 is affixed to the bin 40 (e.g., in the nozzle 60 above the gate member 710). The solenoid 740 includes a pin 742 that can be selectively reciprocated in an unlatch direction DU to a retracted position, and in a latch direction DL to an extended position. In the retracted position, the pin 742 is clear of the swing path of the latch prong 716. In the extended position, the pin 742 intersects the swing path of the latch prong 716. The solenoid 740 may be operatively connected to a controller 744 mounted on the bin 40, for example.

In use, the gate member 710 transitions between open and closed positions in the same manner as described above with regard to the gate member 310, except that a latch mechanism comprising the latch prong 716 and the pin 742 serves to positively lock the gate member 710 in the closed position. When the bin 40 is at rest, controller 744 maintains the latch pin 742 in the extended position. In this manner, the gate member 710 is prevented from opening by the interlock between the latch prong 716 and the pin 742. When it is desired to open the gate member 710 to dispense tablets T, the controller 744 will actuate the solenoid to retract the pin 742. When the forward flow FF is initiated with the pin 742 retracted, the gate member 710 is permitted to swing into the open position under the force of the forward flow FF. Upon cessation of the forward flow FF (which may include initiation of the reverse flow FR), the gate member 710 will return to its closed position, after which the controller 744 may actuate the solenoid to extend the pin 742 to again interlock the pin 742 with the latch prong 716.

According to some embodiments, the controller 12 will actuate the solenoid 740 to retract the pin 742 as part of a count session initiation cycle and will actuate or permit the solenoid to extend the pin 742 at the end of the corresponding count session. According to some embodiments, the controller 744 will actuate the solenoid 740 to retract the pin 742 upon installation of the bin 40 in the frame 14 and will actuate or permit the solenoid 740 to extend the pin 742 when the bin 40 is removed from the frame 14. For example, the solenoid 740 may be spring biased to default to the latched position when the solenoid is not energized. According to some embodiments, the solenoid 740 is only actuated to retract the pin 742 if the bin 40 is installed in the frame 14 and a proper dispensing or counting session has been initiated and not yet terminated.

Figure 12:
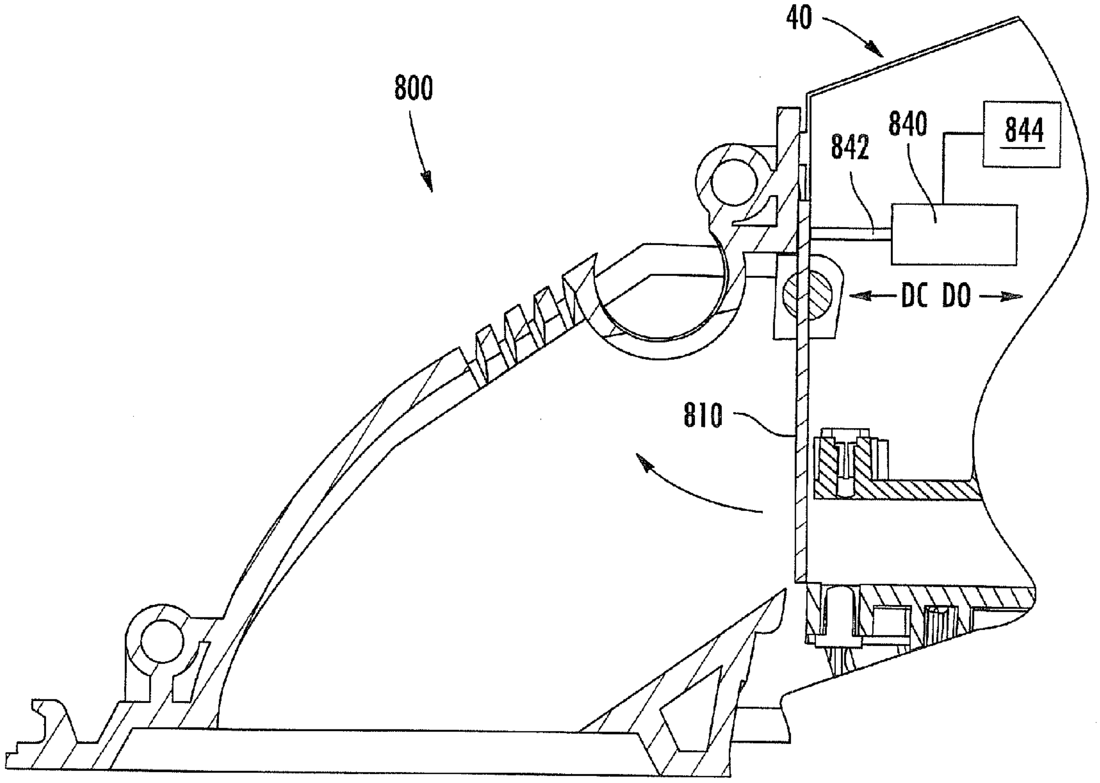
FIG. 12 is a cross-sectional view of a nozzle and a gate system according to further embodiments of the present invention, wherein a gate member thereof is in a closed position.

With reference to FIG. 12, a gate system 800 according to further embodiments of the present invention is shown therein. The gate system 800 may be installed on the bin 40 in place of the gate system 300 and will operate in a similar manner except as follows. The gate assembly 800 includes a gate member or panel 810 formed of a substantially rigid material. The gate member 810 is pivotally mounted in the nozzle 60.

A latch actuator such as a solenoid 840 is affixed to the bin 40. The solenoid 840 may be operatively connected to a controller 844 mounted on the bin 40, for example. The solenoid 840 includes a pin 842 that can be selectively reciprocated in an unlatch or opening direction DO to a retracted position, and in a latch or closing direction DC to an extended position (as shown). The pin 842 is operatively coupled to the gate member 810 directly or via a suitable linkage. When the pin 842 is in the retracted position, the gate member 810 is positioned in the open position. When the pin 842 is in the extended position, the gate member 810 is positioned in the closed position. The solenoid 840 can thereby be selectively operated (e.g., by the controller 844) to forcibly transition the gate member 810 into each of the open and closed positions. In this embodiment, the transitioning between the open and closed positions is non-passive in that the movement is not only permitted by the action of the solenoid, but is instead effectuated by the action of the solenoid. Other suitable types of latch actuators may be used in addition to or in place of the solenoid 840, such as, for example, a muscle wire, a bimetallic spring, a piezoelectric actuator, or a coil coupled with a magnet or metal part (e.g., without a mechanical actuator).

Various modifications may be made in accordance with further embodiments of the present invention. For example, the flexible flaps 110, 210, 430, 530 may also be provided with throughholes to reduce the amount of material and/or alter the stiffness of the flap. Such throughholes may also facilitate the operation of the backjet.

As discussed above, in some embodiments the gate system is configured such that the dispensed tablets T strike the gate member. According to other embodiments, the gate member is positioned fully out of the path of the dispensed tablets when in the open position. This may be particularly desirable in the case of the rigid gate members.

Various attributes of the gate members may be selected to tune the performance of the gate system. For example, the degree of gate member deflection and/or the rate of return to the closed position may be adjusted by selection of the gate member material and/or the thickness or hole pattern of the gate member.

Gate systems as disclosed herein may provide improved tablet security without unduly degrading performance of a dispensing apparatus such as the bin 40. The gate systems may provide a mechanical solution that is durable, reliable and cost-effective. While the gate systems have been described hereinabove with regard to the bin 40 and the dispensing system 10, gate systems according to embodiments of the present invention may be used with bins and/or systems of other types and configurations. Gate systems according to embodiments of the present invention may include components differently configured from those of the gate systems 100-800.

While embodiments employing gas flow drive mechanisms are described herein, other embodiments of the present invention may employ other drive mechanisms in place of or in addition to a drive gas flow. For example, the pharmaceutical articles may be passed in the forward and/or reverse direction by vibration and/or gravity.

According to some embodiments, dispensing bins and/or gate systems as described herein may be employed in a semi-automated system such as those disclosed in co-pending U.S. patent application Ser. No. 12/187,666, filed Aug. 7, 2008, the disclosure of which is incorporated herein by reference.

While the magnet-biased gate system 300 is described above as including a substantially rigid gate panel 310, according to other embodiments, magnets may be incorporated in gate systems (e.g., the gate system 100) having flexible gate panels to bias the flexible gate panels into a closed position.

According to some embodiments of the invention, the gate member may be a flexible gate member that is selectively constructed to have a force profile that enables or enhances performance of its intended function. For example, the flexible gate member 110 (FIGS. 5A-5G) can be selectively constructed with a flexible material employing various different (i.e., non-uniform) densities, durometers and/or cross-sectional thicknesses to achieve a desired non-uniform force profile.

Figure 13:
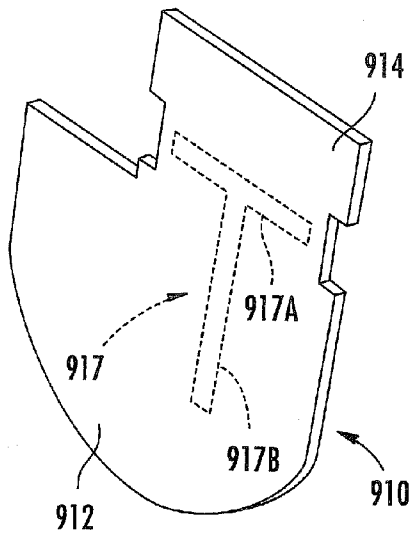
FIG. 13 is a perspective view of a gate member according to further embodiments of the present invention.

In some embodiments, a supplemental reinforcing or biasing member can be mounted on (including in) the flexible gate member 110 to alter its force profile. FIG. 13 illustrates an alternative gate member 910 that can replace the gate member 110 (FIGS. 5A-5G). The gate member 910 is formed in the same manner as the gate member 110 except that a spring member 917 (e.g., a metal spring strip) is embedded in the gate member 910 during molding of the gate member 910, for example. As illustrated, the spring member 917 has a portion 917A that is embedded in the mount extension 914 and is secured in the slot 122 of the crossbar 120 (FIG. 5G) when mounted, and a portion 917B extending into the flap body 912. When the flap body 912 is deflected open, the spring member 917 bends and biases the flap body 912 to return to the closed position.

The foregoing is illustrative of the present invention and is not to be construed as limiting thereof. Although a few exemplary embodiments of this invention has been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An apparatus for dispensing solid articles, the apparatus comprising:

a housing defining a dispensing channel and a portal through which articles can flow along a dispensing pathway;

a gate system including a gate member positioned in the dispensing pathway, the gate member being selectively positionable between an open position and a closed position;

a latch assembly including a latch member and a latch actuator;

wherein, when the gate member is in the open position, the gate member permits the articles to pass through the portal and, when the gate member is in the closed position, the gate member blocks the articles from passing through the portal;

wherein the gate system is configured such that the gate member is passively transitionable between the open and closed positions; and wherein the latch actuator is selectively operable to lock the gate member in the closed position.

2. The apparatus of claim 1 including a drive mechanism operable to pass the articles along the dispensing path.

3. The apparatus of claim 2 wherein the drive mechanism includes a flow generator configured to generate at least one drive gas flow to pass the articles along the dispensing path and the at least one drive gas flow forces the gate member from the closed position to the open position.

4. The apparatus of claim 1 wherein the gate system is configured such that the gate member is passively transitionable from the closed position to the open position.

5. The apparatus of claim 1 wherein the gate system is configured such that the gate member is passively transitionable from the open position to the closed position.

6. The apparatus of claim 1 wherein the gate system is configured such that the gate member is biased toward the closed position.

7. The apparatus of claim 6 wherein the gate member is formed of an elastically deformable material and is bendable to assume the open position.

8. The apparatus of claim 7 wherein the gate system further includes a crossbar mounted on the housing adjacent the portal, wherein the gate member is mounted on the crossbar.

9. The apparatus of claim 7 wherein the gate member is directly captured and supported by the housing.

10. The apparatus of claim 6 wherein the gate system includes a magnet and the gate member is biased toward the closed position by the magnet.

11. The apparatus of claim 1 wherein the gate member is formed of an elastically deformable material.

12. The apparatus of claim 11 wherein the elastically deformable material of the gate member has at least one of a non-uniform density, durometer, and cross-sectional thickness to provide the gate member with a desired force profile.

13. The apparatus of claim 1 wherein the gate member is formed of a flexible material and includes a supplemental reinforcing and/or biasing member mounted on the flexible material to provide the gate member with a desired force profile.

14. The apparatus of claim 1 wherein the gate member is substantially rigid.

15. The apparatus of claim 14 wherein the gate system further includes a flexible spring flap downstream of and adjacent to the gate member, wherein the flexible spring flap biases the gate member toward the closed position and is responsive to a drive gas flow to draw the gate member into the open position.

16. The apparatus of claim 15 wherein the gate system includes a substantially rigid latch panel, wherein:

the latch panel includes a latch structure that engages the housing to prevent the gate member from opening; and the latch panel is responsive to a drive gas flow to permit the gate member to transition into the open position.

17. The apparatus of claim 15 wherein:

the gate system includes a latch mechanism positionable in each of a latched position wherein the latch mechanism prevents the gate member from opening, and an unlatched position, wherein the latch mechanism permits the gate member to transition into the open position; and the latch mechanism includes a flexible latch flap responsive to a drive gas flow to transition the latch mechanism from the latched position to the unlatched position.

18. The apparatus of claim 1 wherein the gate member includes holes defined therein.

19. The apparatus of claim 1 wherein the latch actuator includes a solenoid.

20. The apparatus of claim 1 wherein the dimensions of the portal are selectively adjustable.

21. The apparatus of claim 1 including a nozzle member disposed downstream of the dispensing channel and the portal, wherein:

the nozzle member defines a curvilinear nozzle channel forming a part of the dispensing pathway; and the gate member is disposed between the dispensing channel and the nozzle channel and is configured and positioned to intercept and absorb kinetic energy from the articles as the articles travel from the portal to be dispensed.

22. The apparatus of claim 1 including:

a hopper chamber to hold the articles, wherein the hopper chamber is in fluid communication with the dispensing channel;

an access door to permit access to the hopper chamber to introduce the articles into the hopper chamber, the access door being selectively positionable between an open position and a closed position; and a lock assembly to selectively secure the access door in the closed position.

23. The apparatus of claim 1 including a sensor disposed along the dispensing pathway to detect the articles passing along the dispensing pathway.

24. A method for dispensing solid articles, the method comprising:

providing an apparatus including:

a housing defining a dispensing channel and a portal through which articles can flow along a dispensing pathway; and a gate system including a gate member positioned in the dispensing pathway, the gate member being selectively positionable between an open position and a closed position; and a latch assembly including a latch member and a latch actuator;

wherein, when the gate member is in the open position, the gate member permits the articles to pass through the portal and, when the gate member is in the closed position, the gate member blocks the articles from passing through the portal; and wherein the gate system is configured such that the gate member is passively transitionable between the open and closed positions;

transitioning the gate member from the closed position to the open position and, with the gate member in the open position, passing the articles along the dispensing pathway, through the portal, and past the gate member;

transitioning the gate member from the open position to the closed position such that the gate member blocks the articles from passing through the portal;

selectively operating the latch actuator to lock the gate member in the closed position.

25. The method of claim 24 including generating at least one drive gas flow using a flow generator to force the articles along the dispensing pathway and to force the gate member from the closed position to the open position.

26. The method of claim 24 wherein the articles are pharmaceutical articles.

27. The method of claim 24 wherein the latch actuator includes a solenoid.

28. An apparatus for dispensing solid articles, the apparatus comprising:

a housing defining a dispensing channel and a portal through which articles can flow along a dispensing pathway;

a gate system including a gate member positioned in the dispensing pathway, the gate member being selectively positionable between an open position and a closed position;

wherein, when the gate member is in the open position, the gate member permits the articles to pass through the portal and, when the gate member is in the closed position, the gate member blocks the articles from passing through the portal;

wherein the gate system is configured such that the gate member is passively transitionable between the open and closed positions;

wherein the gate member is substantially rigid;

wherein the gate system further includes a flexible spring flap downstream of and adjacent to the gate member, wherein the flexible spring flap biases the gate member toward the closed position and is responsive to a drive gas flow to draw the gate member into the open position; and wherein the gate system includes a substantially rigid latch panel, wherein:

the latch panel includes a latch structure that engages the housing to prevent the gate member from opening; and the latch panel is responsive to a drive gas flow to permit the gate member to transition into the open position.

29. An apparatus for dispensing solid articles, the apparatus comprising:

a housing defining a dispensing channel and a portal through which articles can flow along a dispensing pathway;

a gate system including a gate member positioned in the dispensing pathway, the gate member being selectively positionable between an open position and a closed position;

wherein, when the gate member is in the open position, the gate member permits the articles to pass through the portal and, when the gate member is in the closed position, the gate member blocks the articles from passing through the portal;

wherein the gate system is configured such that the gate member is passively transitionable between the open and closed positions;

wherein the gate member is substantially rigid;

wherein the gate system further includes a flexible spring flap downstream of and adjacent to the gate member, wherein the flexible spring flap biases the gate member toward the closed position and is responsive to a drive gas flow to draw the gate member into the open position; and wherein:

the gate system includes a latch mechanism positionable in each of a latched position wherein the latch mechanism prevents the gate member from opening, and an unlatched position, wherein the latch mechanism permits the gate member to transition into the open position; and the latch mechanism includes a flexible latch flap responsive to a drive gas flow to transition the latch mechanism from the latched position to the unlatched position.

* * * * *